US012753846B2

(12) United States Patent
Wang et al.

(10) Patent No.: US 12,753,846 B2
(45) Date of Patent: Oct. 6, 2026

(54) CONTROL VALVE

(71) Applicant: ZHEJIANG SANHUA AUTOMOTIVE COMPONENTS CO., LTD., Hangzhou (CN)

(72) Inventors: Lixin Wang, Hangzhou (CN); Jianhua Chi, Hangzhou (CN); Yuzhi Yang, Hangzhou (CN); Long Lin, Hangzhou (CN); Yun Wang, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 0 days.

(21) Appl. No.: 18/867,840

(22) PCT Filed: May 23, 2023

(86) PCT No.: PCT/CN2023/095681
§ 371 (c)(1),
(2) Date: Nov. 21, 2024

(87) PCT Pub. No.: WO2023/226953
PCT Pub. Date: Nov. 30, 2023

(65) Prior Publication Data

US 2025/0327524 A1 Oct. 23, 2025

(30) Foreign Application Priority Data

May 23, 2022 (CN) ......................... 202210563015.3

(51) Int. Cl.
*F16K 11/087* (2006.01)
*F16K 11/085* (2006.01)
(Continued)

(52) U.S. Cl.
CPC ...... *F16K 11/0873* (2013.01); *F16K 11/0856* (2013.01); *F16K 11/22* (2013.01); *F16K 27/067* (2013.01)

(58) Field of Classification Search
CPC ... F16K 11/22; F16K 11/0856; F16K 11/0873
See application file for complete search history.

(56) References Cited

U.S. PATENT DOCUMENTS 6,000,430 A * 12/1999 Nafz .................. F16K 11/0876
137/625.11
6,647,934 B2 11/2003 Loring et al.
(Continued)

FOREIGN PATENT DOCUMENTS

CN 110843465 A 2/2020
CN 210423815 U 4/2020
(Continued)

OTHER PUBLICATIONS

International Search Report for PCT/CN2023/095681 mailed Sep. 6, 2023, ISA/CN.
(Continued)

*Primary Examiner* — Atif H Chaudry
(74) *Attorney, Agent, or Firm* — Yue (Robert) Xu; Apex Attorneys at Law, LLP

(57) ABSTRACT

A control valve includes a valve body assembly at least partially located in a valve cavity and a valve core assembly having communication ports including a first communication port, a second communication port, a third communication port, a fourth communication port and a fifth communication port. The valve core assembly has a first conducting portion and a second conducting portion. In a first work position of the valve core assembly, the second conducting portion is communicated with the first communication port and the fourth communication port, and the first conducting portion is communicated with the second
(Continued)

communication port and the third communication port; in a second work position of the valve core assembly, the second conducting portion is communicated with the first communication port and the fifth communication port, and the first conducting portion is communicated with the second communication port and the third communication port.

17 Claims, 17 Drawing Sheets

(51) Int. Cl.

*F16K 11/22* (2006.01)

*F16K 27/06* (2006.01)

(56) References Cited

U.S. PATENT DOCUMENTS

| | | | |
|---|---|---|---|
| 2015/0354714 A1 | 12/2015 | Morein | |
| 2020/0200284 A1* | 6/2020 | Ledvora | F16K 11/0856 |

FOREIGN PATENT DOCUMENTS

| | | | |
|---|---|---|---|
| CN | 111828687 | A | 10/2020 |
| CN | 112780805 | A | 5/2021 |
| CN | 112901823 | A | 6/2021 |
| CN | 112901824 | A | 6/2021 |
| EP | 3885544 | A1 | 9/2021 |

OTHER PUBLICATIONS

The European search report issued on Apr. 21, 2026 for EP23811024.1.

* cited by examiner (c)

(d)

(e)

(f)

(a)

(b)

(c)

(f)

CONTROL VALVE

The present application is the national phase of International Application No. PCT/CN2023/095681, titled "CONTROL VALVE", filed on May 23, 2023, which claims the priority of the Chinese Patent Application No. 202210563015.3, titled "CONTROL VALVE", filed with the China National Intellectual Property Administration on May 23, 2022, the entire disclosures of which are incorporated herein by reference.

FIELD

The present application relates to the technical field of fluid control, and in particular to a control valve.

BACKGROUND

In the field of new energy vehicles, a thermal management system uses multi-way control valves to control flow paths, and the control valves have more than two operating modes. The control valve includes a valve body and a valve core, where the valve core is rotatably arranged in a valve cavity inside the valve body. The valve body is provided with multiple communication ports located at an inner wall of the valve cavity. In the conventional multi-way valve, the multiple communication ports are located at a same height. In order to accommodate these communication ports, the communication ports are arranged along the circumferential direction of the valve cavity, and thus the circumferential length or radial size of the valve cavity is large, which leads to a large flow resistance of the fluid through the control valve indirectly.

SUMMARY

An object of the present application is to provide a control valve, to reduce a radial size of a valve cavity.

A control valve is provided according to an embodiment of the present application, including a valve body assembly and a valve core assembly, where the control valve has a valve cavity, and the valve core assembly is at least partially located in the valve cavity. The valve body assembly is provided with a communication port, and the communication port is located on a wall defining the valve cavity. The communication port includes a first communication port, a second communication port, a third communication port, a fourth communication port and a fifth communication port. The valve core assembly is provided with a first communicating portion and a second communicating portion. In a first operating position of the valve core assembly, the second communicating portion is in communication with the first communication port, the second communicating portion is in communication with the fourth communication port, the first communicating portion is in communication with the second communication port, and the first communicating portion is in communication with the third communication port. In a second operating position of the valve core assembly, the second communicating portion is in communication with the first communication port, the second communicating portion is in communication with the fifth communication port, the first communicating portion is in communication with the second communication port, and the first communicating portion is in communication with the third communication port. A height direction is defined, which is parallel to an extension direction of the valve core axis of the valve core assembly, and in the height direction, the second communication port and the third communication port are provided in a staggered manner.

In the control valve provided according to an embodiment of the present application, in the height direction, the second communication port and the third communication port are provided in a staggered manner, which reduces the number of the communication ports located at the same height, and thereby decreasing the radial size of the valve cavity.

DETAILED DESCRIPTION OF THE EMBODIMENTS

Figure 1:
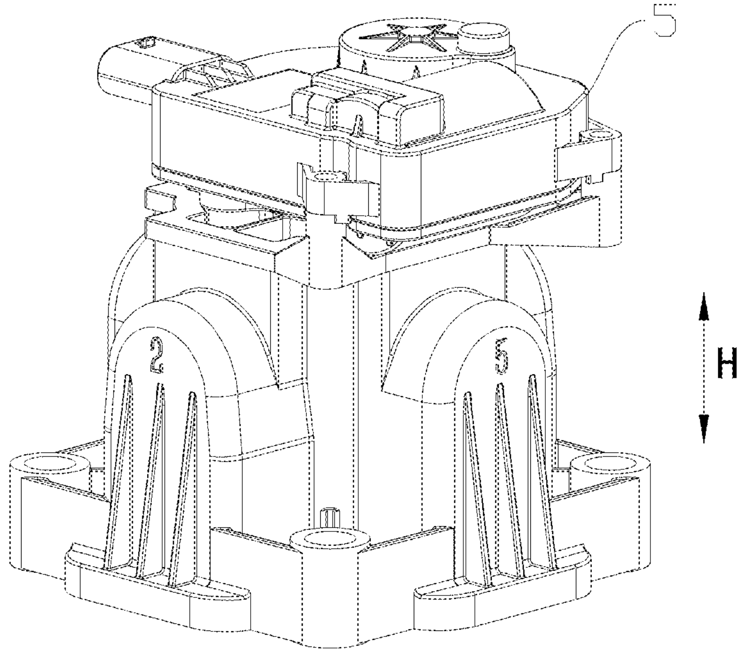
FIG. 1 is a schematic perspective view showing the structure of a control valve according to an embodiment of the present application.

In the description of the present application, it should be noted that the orientation or positional relationship indicated by the terms, such as "central", "longitudinal", "transversal", "upper", "lower", "front", "rear", "left", "right", "vertical", "horizontal", "top", "bottom", "inner", and "outer" and the like are based on the orientation or positional relationship shown in the drawings, which are only used to facilitate the description of the present application and to simplify the description, rather than indicating or implying that the device or element referred to must have a specific orientation, or can only be configured and operated in a particular orientation. Therefore the above terms should not be construed as a limitation to the present application.

The embodiments are described in detail hereinafter in conjunction with the accompanying drawings.

As shown in FIG. 1 to FIG. 5, a control valve 200 includes a valve body assembly 1, a valve core assembly 2 and a driving part 5. The valve body assembly 1 has a valve cavity 100, the valve core assembly 2 is at least partially located in the valve cavity 100, and the valve core assembly 2 can be driven by the driving part 5 to rotate. The valve core assembly 2 can rotate around a valve core axis X-X, and a position detection element may be provided in the driving part 5 for detecting a rotation angle of the valve core assembly 2. A height direction is defined as H, which is parallel or substantially parallel to an extension direction of the valve core axis of the valve core assembly 2. In the present application, "valve core axis" refers to the valve core axis of the valve core assembly 2, "circumferential direction" refers to the circumferential direction of the valve core assembly 2, and "radial direction" refers to the radial direction of the valve core assembly 2 or a direction parallel to the radial direction of the valve core assembly 2.

As shown in FIG. 5 to FIG. 9, the valve body assembly 1 has seven communication ports, including a first communication port 101, a second communication port 102, a third communication port 103, a fourth communication port 104, a fifth communication port 105, a sixth communication port 106 and a seventh communication port 107. The seven communication ports are located at a wall defining the valve cavity 100. The valve body assembly 1 has five connection ports, including a first connection port 111, a second connection port 112, a third connection port 113, a fourth connection port 114 and a fifth connection port 115. The second communication port 102 is in communication with the third connection port 113, the fifth communication port 105 is in communication with the first connection port 111, the fourth communication port 104 is in communication with the fifth connection port 115, the third communication port 103 is in communication with the fourth connection port 114, both the first communication port 101 and the sixth communication port 106 are in communication with the second connection port 112, and both the seventh communication port 107 and the third communication port 103 are in communication with the fourth connection port 114.

A part of the valve core assembly 2 located in the valve cavity 100 has a first communicating portion 211 and a second communicating portion 221, and each of the communicating portions is able to communicate two or more communication ports to realize communication between at least two connection ports. The valve core assembly 2 can open or close the communication ports. "Closing the communication port" means cutting off the communication or circulation between the communication port and the valve cavity 100, and "opening the communication port" means communicating the communication port with the valve cavity 100 or communicating the communication port with at least one of the communicating portions. The first communicating portion 211 includes a first communicating cavity and a wall portion defining the first communicating cavity. Similarly, the second communicating portion 221 includes a second communicating cavity and a wall portion defining the second communicating cavity.

As shown in FIG. 5 to FIG. 9, the valve body assembly 1 includes a valve cover 17, a housing 16, and a partition wall portion 11. The partition wall portion 11 is at least partially located in the housing 16, and the valve cover 17 closes an opening at an upper end of the housing 16. The valve body assembly 1 includes a first cavity 3 and a second cavity 4, where at least part of the first cavity 3 and at least part of the second cavity 4 are located at different heights of the valve body assembly 1, and the partition wall portion 11 separates the first cavity 3 from the second cavity 4. A temperature of a fluid in the first cavity 3 may be different from a temperature of a fluid in the second cavity 4. The partition wall portion 11 can separate the fluid in the first cavity 3 from the fluid in the second cavity 4, thus reducing the mixing of the fluid in the first cavity 3 and the fluid in the second cavity 4, and thereby improving the thermal efficiency.

Specifically, the second communication port 102, the sixth communication port 106 and the third communication port 103 are provided at the wall defining the first cavity 3, and the fourth communication port 104, the fifth communication port 105, the first communication port 101 and the seventh communication port 107 are provided at the wall defining the second cavity 4. The first communicating portion 211 is located in the first cavity 3, and the communicating portion 221 is located in the second cavity 4. In this embodiment, the partition wall portion 11 has a first through hole 19, and a part of the valve core assembly 2 is located in the first through hole 19. The partition wall portion 11 is hermetically arranged with the valve core assembly 2, and the partition wall portion 11 is hermetically arranged with the housing 16. Specifically, the partition wall portion 11 is welded with the housing 16, or in an interference fit with the housing 16, or integrally formed with the housing 16.

In other embodiments, the partition wall portion 11 is integrally formed with the valve core assembly 2, and the partition wall portion 11 is slidably sealed with the wall defining the valve cavity 100. Or, the partition wall portion 11 is slidably sealed with the housing 16. This integrally formed valve core assembly 2 is convenient to assemble.

As shown in FIG. 5 to FIG. 9, the valve core assembly 2 includes a first valve core portion 21 and a second valve core portion 22. The first valve core portion 21 and the second valve core portion 22 are arranged along an axial direction of the valve core assembly 2, and the first valve core portion 21 is in transmission connection with the second valve core portion 22. The first communicating portion 211 is located in the first valve core portion 21, and the second communicating portion 221 is located in the second valve core portion 22. The second valve core portion 22 can drive the first valve core portion 21 to rotate, so as to allow the transmission connection therebetween. The second valve core portion 22 and the first valve core portion 21 may be directly connected to each other or may be in transmission connection with each other via other components. The first valve core portion 21 is located in the first cavity 3, and the second valve core portion 22 is located in the second cavity 4.

An outer wall of the first valve core portion 21 is a part of a virtual spherical shape, and the sixth communication port 106 and the third communication port 103 can face the outer wall of the first valve core portion 21. In other embodiments, the outer wall of the first valve core portion 21 may also be a part of a virtual column shape or a part of another revolving body. An outer wall of the second valve core portion 22 is a part of a virtual spherical shape, and the fourth communication port 104, the fifth communication port 105, the first communication port 101 and the seventh communication port 107 can face the outer wall of the second valve core portion 22.

In other embodiments, the outer wall of the second valve core portion 22 may also be a part of a virtual column shape or a part of another revolving body, and a revolving axis of the revolving body is the valve core axis of the valve core assembly 2.

Figure 6:
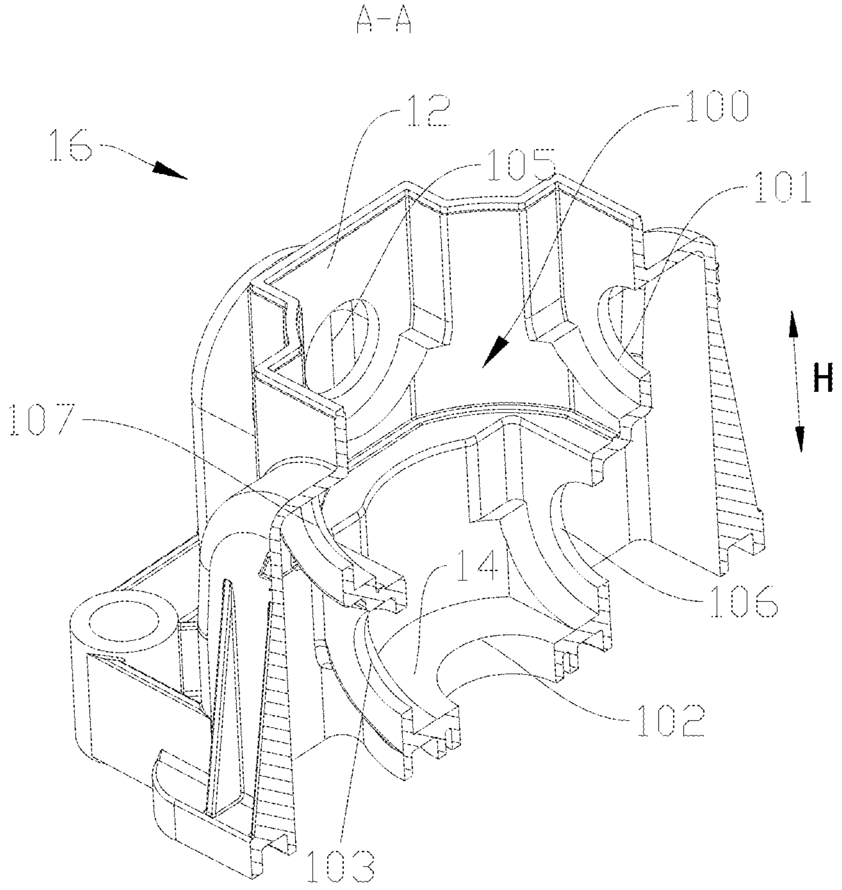
FIG. 6 is a schematic perspective cross-sectional view showing the structure of a housing of the control valve in FIG. 4 taken along line A-A.
Figure 7:
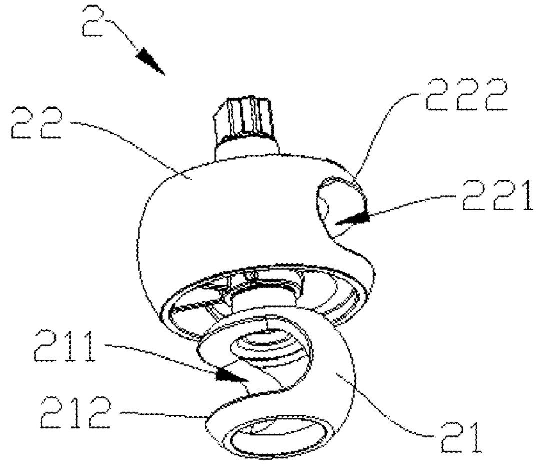
FIG. 7 is a schematic perspective view showing the structure of a valve core assembly of the control valve in FIG. 5.
Figure 8:
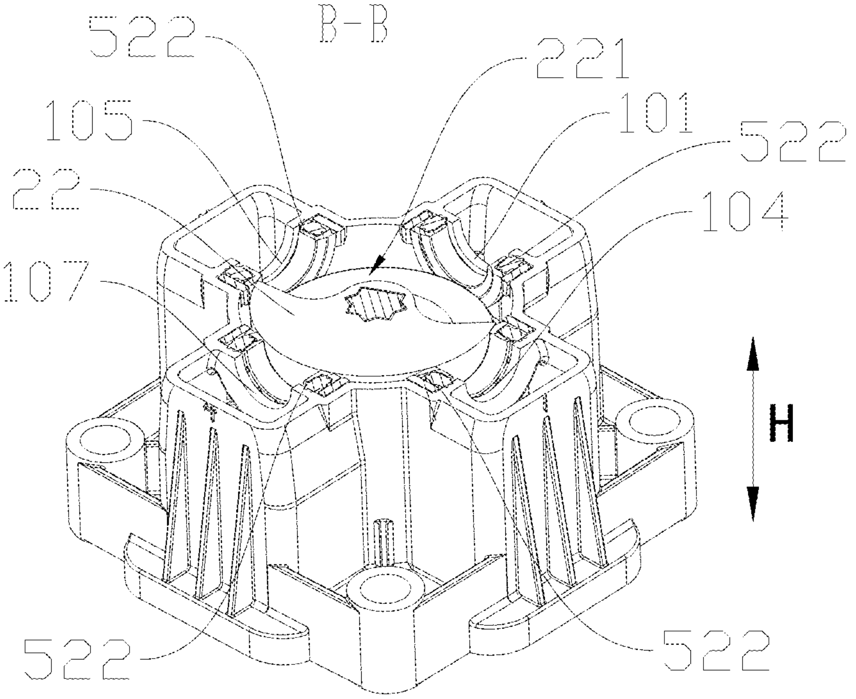
FIG. 8 is a schematic cross-sectional view showing the structure of the control valve in FIG. 4 taken along line B-B.
Figure 9:
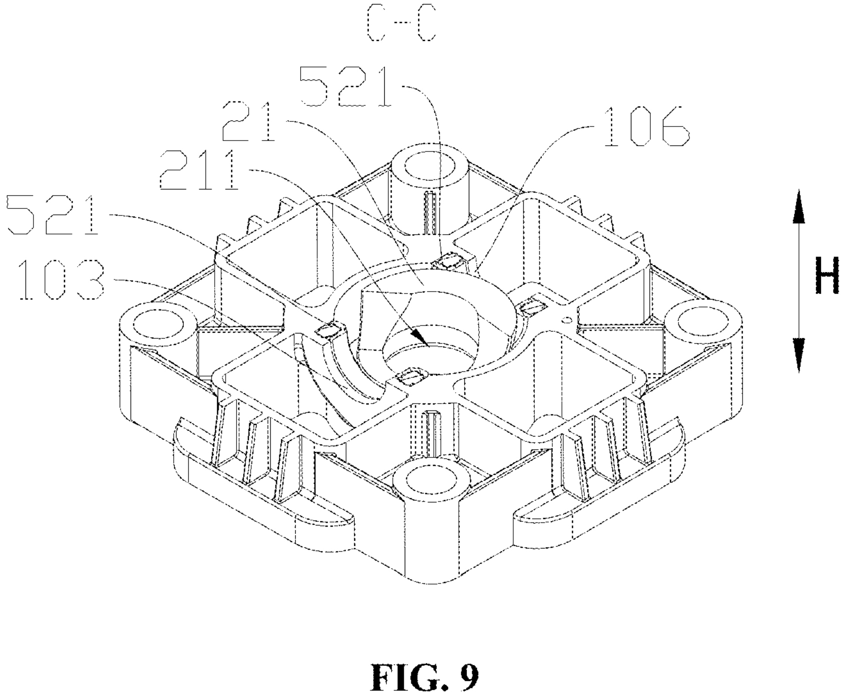
FIG. 9 is a schematic cross-sectional view showing the structure of the control valve in FIG. 4 taken along line C-C.

As shown in FIG. 6, the wall defining the valve cavity 100 includes a side wall 12 and a bottom wall 14. In the height direction H, the bottom wall 14 is located on one side of the valve body assembly 1. The side wall 12 extends in the height direction, and the side wall 12 circumferentially surrounds the valve cavity 100.

As shown in FIG. 5 to FIG. 9, the control valve includes at least one first sealing member 521, at least one second sealing member 522 and a third sealing member 18. The first sealing member 521 is located between the wall defining the first cavity 3 and the first valve core portion 21, and the second sealing member 522 is located between the wall defining the second cavity 4 and the second valve core portion 22. The first sealing member 521 and the second sealing member 522 cooperate with the valve core assembly 2 to close or open the communication port.

In this embodiment, one of the first sealing members 521 is located around the sixth communication port 106 and another one of the first sealing members 521 is located around the third communication port 103. A part of the first sealing member 521 is complementary to the shape of the outer wall of the first valve core portion 21 and is sealingly contact with the outer wall of the first valve core portion 21.

One of the second sealing members 522 is located around the fourth communication port 104, another one of the second sealing members 522 is located around the fifth communication port 105, yet another one of the second sealing members 522 is located around the first communication port 101, and still another one of the second sealing members 522 is located around the seventh communication port 107. A part of the second sealing member 522 is complementary in shape to the outer wall of the second valve core portion 22 and is sealingly contact with the outer wall of the second valve core portion 22.

The third sealing member 18 is in contact with the valve core assembly 2 and the partition wall portion 11. The third sealing member 18 is used to prevent fluid exchange between the first cavity 3 and the second cavity 4 through the first through hole 19. The third sealing member 18 may be a sealing ring with a cross section of an "X" shape.

As shown in FIG. 5 to FIG. 9, along the height direction H, the fourth communication port 104, the fifth communication port 105, the first communication port 101 and the seventh communication port 107 are located in substantially a same height range and at different radial directions. The third communication port 103 and the sixth communication port 106 are located in substantially a same height range and at different radial directions. The second communication port 102 and the sixth communication port 106 are located at different heights. That is, the communication ports are located in at least two different height ranges. This arrangement is beneficial to reducing the number of ports in the same height range, in other words, reducing the positions occupied by the connection ports in the same height range, thereby reducing size of the valve cavity 100 and the valve core assembly 2 in the radial direction, which makes the fluid resistance of the control valve relatively small and the torque required to rotate the valve core assembly 2 relatively small. In addition, such arrangement of the communication ports makes the size of the control valve in the radial direction relatively compact, which facilitates integration with a flow passage plate, in other words, a mounting area of the flow passage plate for mounting with the control valve can be relatively small.

In other embodiments, a certain deviation between the communication ports is permissible, and the sizes of the communication ports may be different. In this case, the communication ports may meet following requirements: a middle part of an opening of the sixth communication port 106 is located at a height within a height range of an opening of the third communication port 103, a middle part of an opening of the fifth communication port 105 is located at a height within a height range of an opening of the first communication port 101, a middle part of an opening of the fourth communication port 104 is located at a height within the height range of the opening the first communication port 101, and a middle part of an opening of the seventh communication port 107 is located at a height within the height range of the opening of the first communication port 101.

In this embodiment, in the height direction H, the first communication port 101 and the third communication port 103 are arranged in a staggered manner. The first communication port 101, the sixth communication port 106, the third communication port 103, the fourth communication port 104, the fifth communication port 105 and the seventh communication port 107 are all located at the side wall 12, and the second communication port 102 is located at the bottom wall 14. In the height direction H, the second communication port 102 and the third communication port 103 are arranged in a staggered manner, so that the second communication port 102, the first communication port 101 and the third communication port 103 are located at different heights. That is to say, the communication ports are distributed in at least three different height ranges, which can further reduce the size of the valve cavity 100 and the valve core assembly 2 in the radial direction.

In the height direction H, the second communication port 102 is located at one side of the first valve core portion 21. For the first valve core portion 21, only two of the communication ports are provided in the circumferential direction of the first valve core portion 21, which can reduce the size of the first valve core portion 21 in the radial direction and further reduce the torque for rotating the first valve core portion 21. Specifically, a part of the first communicating portion 211 is coaxial with the valve core axis and is provided with an opening at an axial side of the valve core of the first valve core portion 21. The first communicating portion 211 is always in communication with the second communication port 102. The first valve core portion 21 is provided in a form of an on-off valve, which only needs to be able to selectively close the third communication port 103 or the sixth communication port 106 and does not need to have a function of adjusting the flow rate. A center of the second communication port 102 is provided coaxially or substantially coaxially with the valve core axis of the valve core assembly 2.

In addition, the size of the first valve core portion 21 in the radical direction is smaller than that of the second valve core portion 22, that is, the valve core assembly 2 has a structure with a large upper part and a small lower part. When assembling the control valve, the first valve core portion 21 with a small diameter is mounted in the valve cavity 100 firstly, and then the partition wall portion 11 and the second valve core portion 22 with a large diameter are mounted in the valve cavity 100, which facilitates mounting the valve core assembly 2 into the valve cavity 100 from an upper opening of the housing 16.

Both the first communication port 101 and the sixth communication port 106 are in communication with a flow passage of the control valve. The first communication port 101 and the sixth communication port 106 are located in substantially the same radial direction, so that the flow passage for connecting the first communication port 101 and the sixth communication port 106 is short in length and relatively compact in volume. The seventh communication port 107 and the third communication port 103 are located in substantially the same radial direction. In other embodiments, a certain deviation is permissible between the communication ports, and the sizes of the communication ports may be different. For example, the center of the first communication port 101 and the center of the sixth communication port 106 are arranged around the valve core axis at an interval of 0 degrees to 10 degrees, and the center of the seventh communication port 107 and the center of the third communication port 103 are arranged around the valve core axis at an interval of 0 degrees to 10 degrees.

The valve core assembly 2 is able to rotate or slide along the height direction H relative to the valve body assembly 1. In a first operating position of the valve core assembly 2, the second communicating portion 221 is in communication with the first communication port 101, the second communicating portion 221 is in communication with the fourth communication port 104, the first communicating portion 211 is in communication with the second communication port 102, and the first communicating portion 211 is in communication with the third communication port 103. In a second operating position of the valve core assembly 2, the second communicating portion 221 is in communication with the first communication port 101, the first communication port 101 is in communication with the fifth communication port 105, the first communicating portion 211 is in communication with the second communication port 102, and the first communicating portion 211 is in communication with the third communication port 103.

In this embodiment, the valve body assembly 1 has seven communication ports and five connection ports. The valve body assembly 2 is rotated to different operating positions relative to the valve body assembly 1 to achieve different operating modes, as shown in FIG. 13 to FIG. 18. Unidirectional arrows in FIG. 13 to FIG. 18 show one type of flow path of the fluid within the control valve 100, and the control valve 100 in this embodiment has at least six operating modes.

In a first operating mode (a), the third connection port 113 is in communication with the fourth connection port 114 through the second communication port 102, the first communicating portion 211 and the third communication port 103. The second connection port 112 is in communication with the fifth connection port 115 through the first communication port 101, the second communicating portion 221 and the fourth communication port 104. The first connection port 111 is not in communication with any other connection ports.

In a second operating mode (b), the third connection port 113 is in communication with the fourth connection port 114 through the second communication port 102, the first communicating portion 211 and the third communication port 103. The second connection port 112 is in communication with the first connection port 111 through the first communication port 101, the second communicating portion 221 and the fifth communication port 105. The fifth connection port 115 is not in communication with any other connection ports.

In a third operating mode (c), the third connection port 113 is in communication with the second connection port 112 through the second communication port 102, the first communicating portion 211 and the sixth communication port 106. The fourth connection port 114 is in communication with the first connection port 111 through the seventh communication port 107, the second communicating portion 221 and the fifth communication port 105. The fifth connection port 115 is not in communication with any other connection ports.

In a fourth operating mode (d), the third connection port 113 is in communication with the second connection port 112 through the second communication port 102, the first communicating portion 211 and the sixth communication port 106. The fourth connection port 114 is in communication with the fifth connection port 115 through the seventh communication port 107, the second communicating portion 221 and the fourth communication port 104. The first connection port 111 is not in communication with any other connection ports.

In a fifth operating mode (e), the third connection port 113 is in communication with the fourth connection port 114 through the second communication port 102, the first communicating portion 211 and the third communication port 103. The second connection port 112 is in communication with the fifth connection port 115 through the first communication port 101, the second communicating portion 221 and the fourth communication port 104. The second connection port 112 is in communication with the first connection port 111 through the first communication port 101, the second communicating portion 221 and the fifth communication port 105. In this operating mode, both the first connection port 111 and the fifth connection port 115 are in communication with the second connection port 112, and a ratio of a flow amount flowing into the second connection port 112 from the first connection port 111 to a flow amount flowing into the second connection port 112 from the fifth connection port 115 can be adjusted by controlling the valve core assembly 2. For example, in FIG. 17, in the flow amount of the fluid flowing into the second connection port 112, 50% of the flow amount is from the first connection port 111 and 50% of the flow amount is from the fifth connection port 115.

In a sixth operating mode (f), the third connection port 113 is in communication with the second connection port 112 through the second communication port 102, the first communicating portion 211 and the sixth communication port 106. The fourth connection port 114 is in communication with the first connection port 111 through the seventh communication port 107, the second communicating portion 221 and the fifth communication port 105. The fourth connection port 114 is in communication with the fifth connection port 115 through the seventh communication port 107, the second communicating portion 221 and the fourth communication port 104. In this operating mode, both the first connection port 111 and the fifth connection port 115 are in communication with the fourth connection port 114, and a ratio of a flow amount flowing into the fourth connection port 114 from the first connection port 111 to a flow amount flowing into the fourth connection port 114 from the fifth connection port 115 can be adjusted by controlling the valve core assembly 2. For example, in FIG. 18, in the flow amount of the fluid flowing into the fourth connection port 114, 50% of the flow amount is from the first connection port 111 and 50% of the flow amount is from the fifth connection port 115.

In the first operating mode (a), the second operating mode (b), the third operating mode (c) and the fourth operating mode (d), the control valve has only a communication function without a flow amount adjustment function, whereas in the fifth operating mode (e) and the sixth operating mode (f), the control valve has the flow amount adjustment function. Both the first communication port 101 and the sixth communication port 106 are in communication with the second connection port 112, that is, the two communication ports share a common connection port, therefore, the second connection port 112 can be selectively in communication with at least three other connection ports, thus increasing the function of the second connection port 112, in addition, the structure of the valve core assembly 2 is relatively simple and there are less communicating portions. Similarly, both the seventh communication port 107 and the third communication port 103 are in communication with the fourth connection port 114, therefore, the fourth connection port 114 can be selectively in communication with at least three other connection ports, thus increasing the function of the fourth connection port 114.

In this embodiment, the first connection port 111, the fifth connection port 115 and the third connection port 113 are fluid inlets, and the second connection port 112 and the fourth connection port 114 are fluid outlets. In another embodiment, the first connection port 111, the fifth connection port 115 and the third connection port 113 are fluid outlets, and the second connection port 112 and the fourth connection port 114 are fluid inlets, in this case, in the fifth operating mode (e), a ratio of the flow amount flowing from the second connection port 112 into the first connection port 111 to a flow amount flowing from the second connection port 112 into the fifth connection port 115 can be adjusted by controlling the valve core assembly 2; and in the sixth operating mode (f), a ratio of the flow amount flowing from the fourth connection port 114 into the first connection port 111 to a flow amount flowing from the fourth connection port 114 into the fifth connection port 115 can be adjusted by controlling the valve core assembly 2.

As shown in FIG. 8 to FIG. 12, the fourth communication port 104, the first communication port 101, the fifth communication port 105 and the seventh communication port 107 are circumferentially distributed in the listed sequence. A center of the first communication port 101 and a center of the seventh communication port 107 are arranged around the valve core axis at an interval of 120 degrees to 180 degrees, where the interval angle is indicated by β2 in FIG. 12. A center of the fourth communication port 104 and a center of the fifth communication port 105 are arranged around the valve core axis at an interval of 120 degrees to 180 degrees, where the interval angle is indicated by β1 in FIG. 12. Thus, when the second communicating portion 221 is rotated to different positions, the second valve core portion 22 is able to close any two adjacent communication ports among the fourth communication port 104, the fifth communication port 105, the first communication port 101 and the seventh communication port 107, and at the same time, the second communicating portion 221 are able to communicate the other two adjacent communication ports. Accordingly, the center of the sixth communication port 106 and the center of the third communication port 103 are arranged around the valve core axis at an interval of 120 degrees to 180 degrees.

In this embodiment, as shown in FIG. 8 to FIG. 12, the first communication port 101, the fourth communication port 104, the fifth communication port 105, and the seventh communication port 107 are surroundingly and symmetrically along the circumferential direction of the valve core assembly 2, that is, the above four communication ports are arranged in a cross-shape. This arrangement of the communication ports can further reduce the size of the valve cavity 100 in the radial direction, resulting in a relatively small fluid resistance and a relatively compact volume of the control valve. In addition, the first operating mode (a), the second operating mode (b), the third operating mode (c) and the fourth operating mode (d) only have the communication function, and correspond to four different operating positions of the valve core assembly 2, respectively. These four operating positions each has a certain range, in one of the above ranges, the control valve maintains the operating mode unchanged. With the communication ports being arranged in the cross-shape, the range is larger, that is, the sealing range of the control valve is larger, which relatively reduces the requirement for the control accuracy of the valve core assembly 2. For example, in the first operating mode (a), the second operating mode (b), the third operating mode (c) and the fourth operating mode (d), the permissible control deviation of the rotation angle of the valve core assembly 2 may be up to 5 degrees.

As shown in FIG. 5 to FIG. 12, the first communicating portion 211 has a first opening 212 at the outer wall of the valve core assembly 2, and the second communicating portion 221 has a second opening 222 at the outer wall of the valve core assembly 2. The first opening 212 and the second opening 222 are located at different heights along the height direction H. The first opening 212 and the sixth communication port 106 are located in substantially the same height range, and the sixth communication port 106 and the second communication port 102 are located in substantially the same height range, which enables the first opening 212 to at least partially face one or both of the second communication port 102 and the sixth communication port 106. The second opening 222 is located in substantially the same height range as the first communication port 101, and the first communication port 101 is located in substantially the same height range as the fourth communication port 104, the fifth communication port 105 and the seventh communication port 107, which enables the second opening 222 to at least partially face one or two of the fourth communication port 104, the fifth communication port 105, the first communication port 101 and the seventh communication port 107. In other embodiments, a certain deviation is permissible between the above openings and the communication ports, and the sizes of the communication ports may be different. In this case, the following can be satisfied between the above openings and the communication ports: the middle part of the first opening 212 is located at a height in the height range of the opening of the sixth communication port 106, and the middle part of the second opening 222 is located at a height in the height range of the opening of the first communication port 101.

Figure 10:
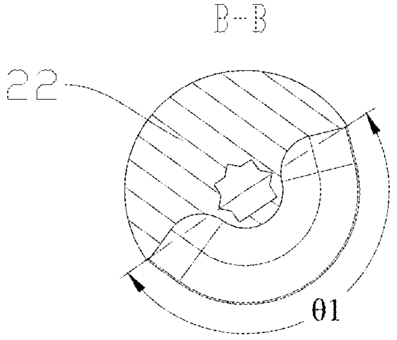
FIG. 10 is a schematic perspective cross-sectional view showing the structure of a second valve core portion of the control valve in FIG. 4 taken along line B-B.

As shown in FIG. 10, in this embodiment, the second communicating portion 221 has only the second opening 222 within the height range of the second opening 222. The second valve core portion 22 is provided with only one communicating portion, that is, the second communicating portion 221. Therefore, in a case that the radial size of the second valve core portion 22 remains unchanged, the second opening 222 can be provided with a larger size, and a flow area of the second communicating portion 221 can be larger, so as to reduce the flow resistance of the fluid flowing through the second communicating portion 221.

Figure 11:
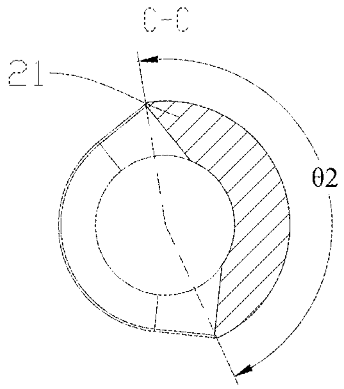
FIG. 11 is a schematic perspective cross-sectional view showing the structure of a first valve core portion of the control valve in FIG. 4 taken along line C-C.
Figure 12:
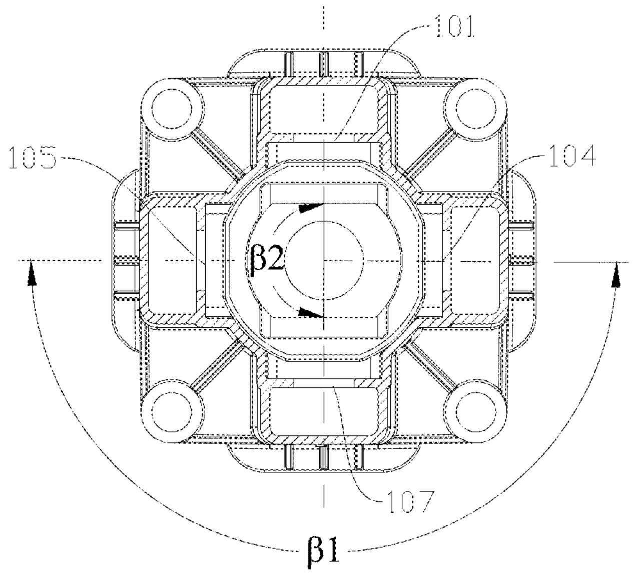
FIG. 12 is a schematic cross-sectional view showing the structure of the housing of the control valve in FIG. 4 taken along line B-B.
Figure 13:
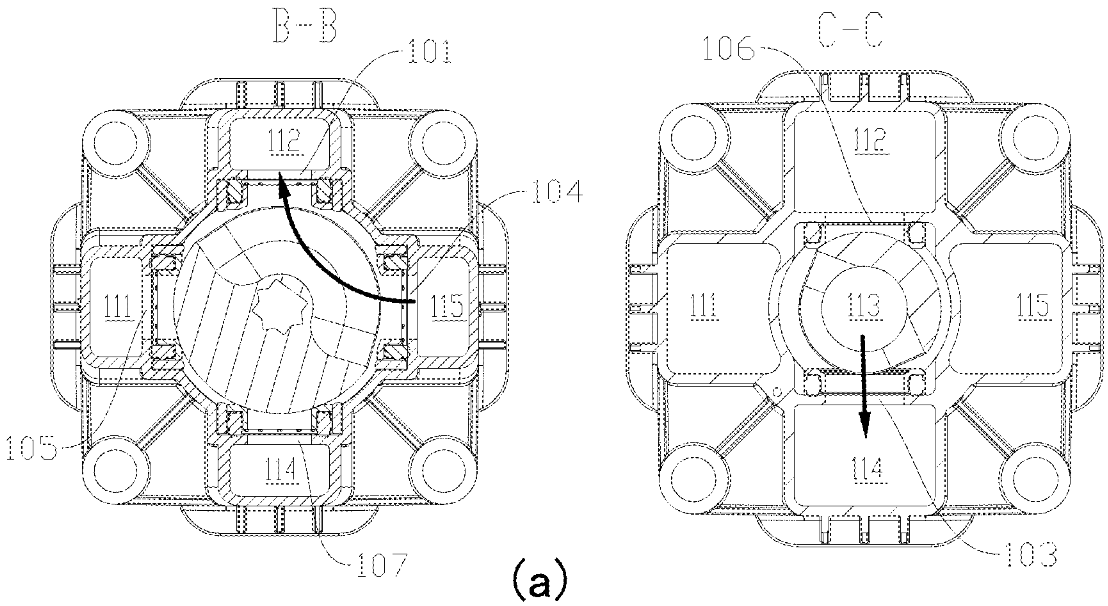
FIG. 13 is a schematic cross-sectional view showing the structure of the control valve in FIG. 4 in a first operating mode taken along line B-B and line C-C.
Figure 14:
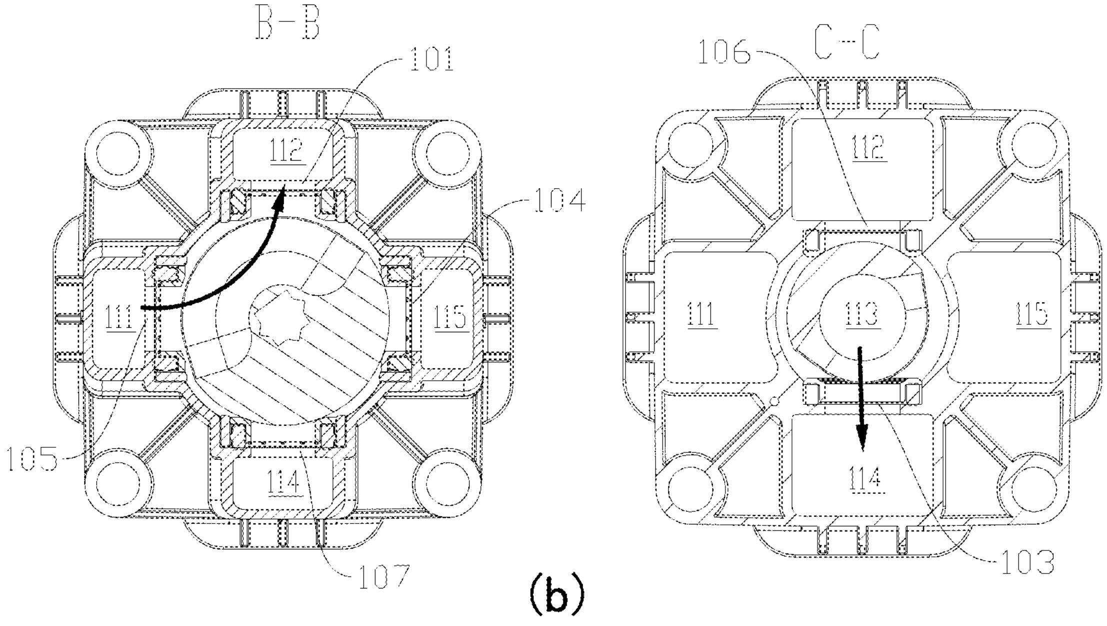
FIG. 14 is a schematic cross-sectional view showing the structure of the control valve in FIG. 4 in a second operating mode taken along line B-B and line C-C.
Figure 15:
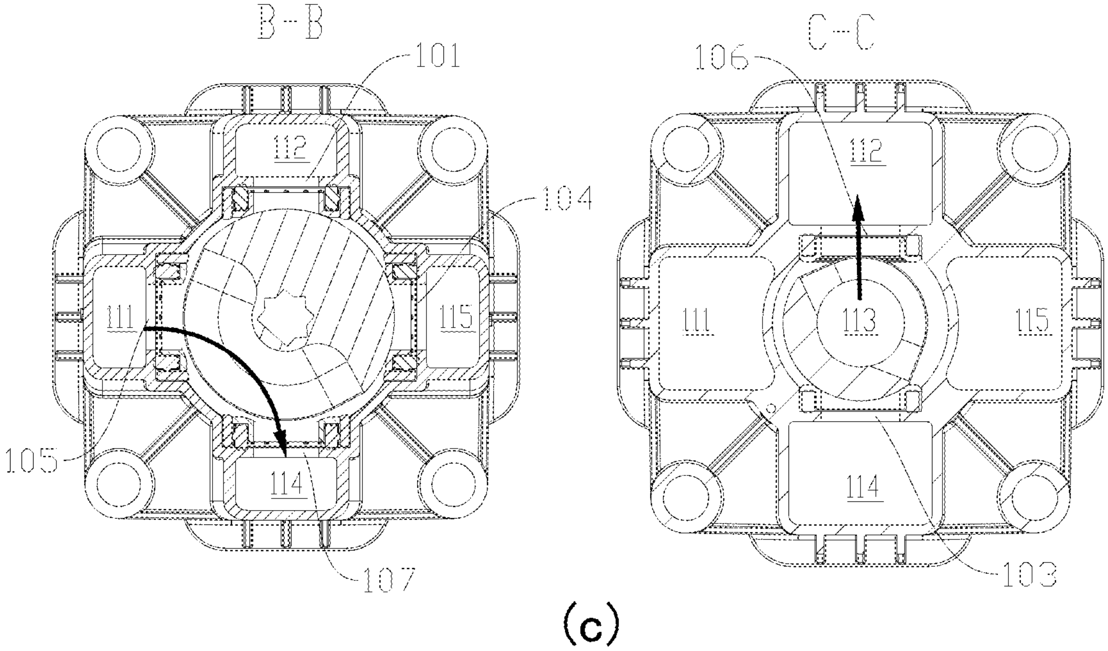
FIG. 15 is a schematic cross-sectional view showing the structure of the control valve in FIG. 4 in a third operating mode taken along line B-B and line C-C.
Figure 16:
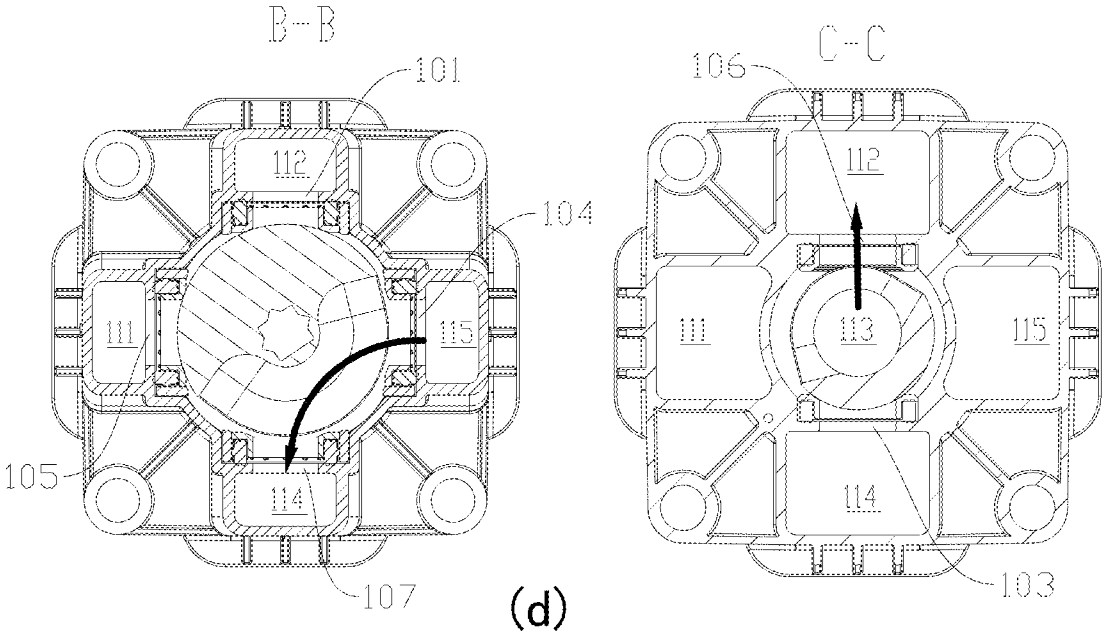
FIG. 16 is a schematic cross-sectional view showing the structure of the control valve in FIG. 4 in a fourth operating mode taken along line B-B and line C-C.
Figure 17:
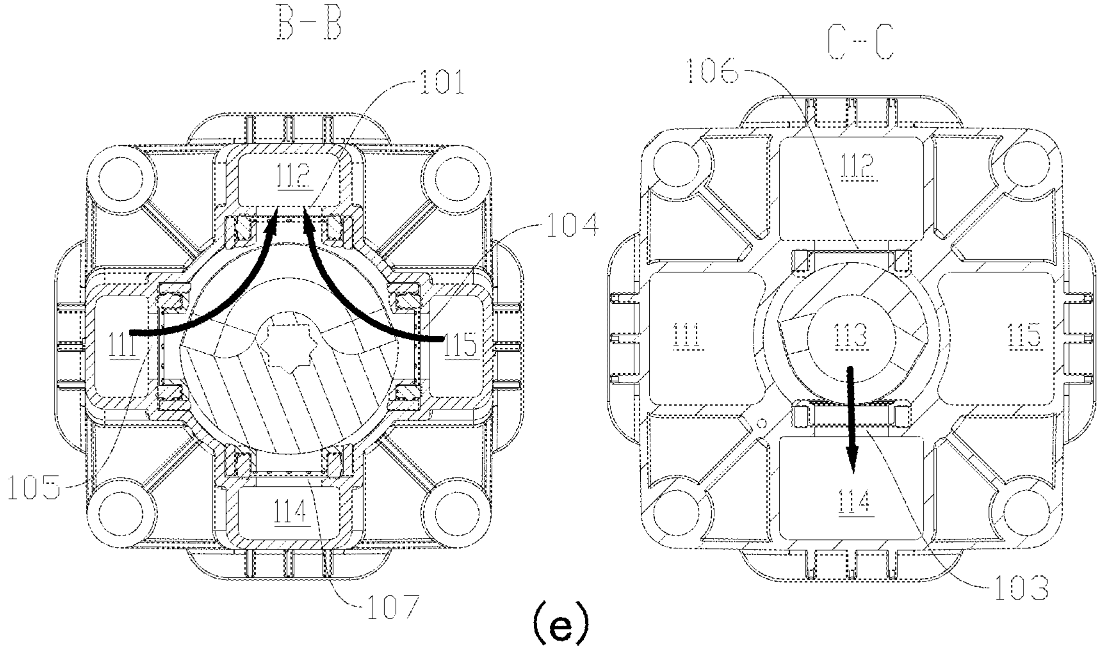
FIG. 17 is a schematic cross-sectional view showing the structure of the control valve in FIG. 4 in a fifth operating mode taken along line B-B and line C-C.
Figure 18:
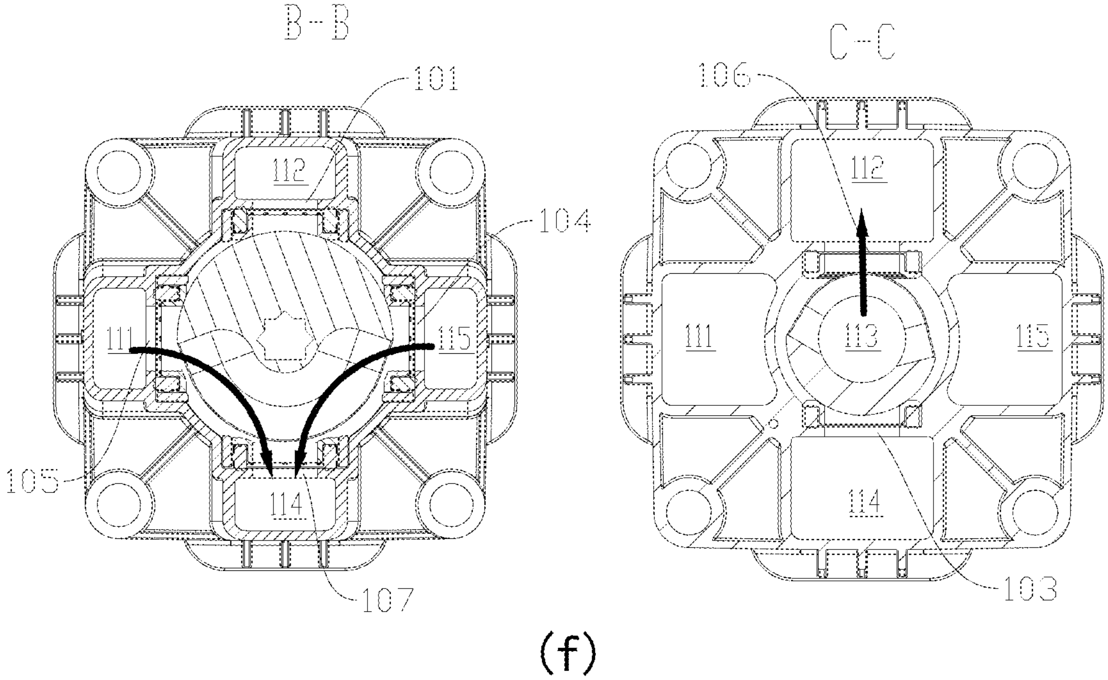
FIG. 18 is a schematic cross-sectional view showing the structure of the control valve in FIG. 4 in a sixth operating mode taken along line B-B and line C-C.

As shown in FIG. 11, two ends of the second opening 222 along the circumferential direction are located around the valve core axis at an interval of 160 degrees to 200 degrees, where the interval angle is indicated by θ2 in FIG. 11, so that the second communicating portion 221 has a large span in the circumferential direction, and is able to be in communication with three communication ports at the same time, thereby realizing the function of flow amount adjustment in the fifth operating mode (e) and the sixth operating mode (f). In addition, a part of the outer wall of the valve core assembly 2 is located at the same height as the second opening 222, this part of the outer wall can be used to close the communication ports at the same height, and the interval angle of the second opening 222 enables the second valve core portion 22 to have a larger range for closing.

The first communicating portion 211 has only the first opening 212 within the height range of the first opening 212. The first valve core portion 21 has only one communicating portion, namely the first communicating portion 211. Two ends of the first opening 212 along the circumferential direction are located around the valve core axis at an interval of 160 degrees to 200 degrees, where the interval angle is indicated by θ1 in FIG. 10, and similarly, the flow resistance of the fluid flowing through the first communicating portion 211 can be reduced or the size of the first valve core portion 21 in the radial direction can be reduced. A part of the outer wall of the valve core assembly 2 is located at the same height as the first opening 212, and this part of the outer wall can be used to close the communication ports at the same height.

In a direction perpendicular to the valve core axis, the first opening 212 and the second opening 222 are oriented opposite to each other. Specifically, the center of the first opening 212 and the center of the second opening 222 are arranged around the valve core axis at an interval of 160 degrees to 200 degrees, such that in most of the operating positions of the valve core assembly 2, the sixth communication port 106 and the first communication port 101 are not simultaneously in communication with the second connection port 112, to avoid reduction of the thermal efficiency due to the fluids in the first cavity 3 and the second cavity 4 being mixed through the sixth communication port 106 and the first communication port 101. Similarly, in most of the operating positions of the valve core assembly 2, the third communication port 103 and the seventh communication port 107 are not simultaneously in communication with the fourth connection port 114, to avoid the fluids in the first cavity 3 and the second cavity 4 from being mixed.

In the first operating position of the valve core assembly 2, the second communicating portion 221 is in communication with the first communication port 101, the second communicating portion 221 is in communication with the fourth communication port 104, the first communicating portion 211 is in communication with the second communication port 102, and the first communicating portion 211 is in communication with the third communication port 103.

In the second operating position of the valve core assembly 2, the second communicating portion 221 is in communication with the first communication port 101, the first communication port 101 is in communication with the fifth communication port 105, the first communicating portion 211 is in communication with the second communication port 102, and the first communicating portion 211 is in communication with the third communication port 103.

Corresponding to the above-mentioned opening structure and the relationship between the connection ports and the communication ports of the valve body assembly 1, the valve core assembly 2 has at least a first operating position group and a second operating position group, where the first operating position group corresponds to at least two operating positions of the valve core assembly 2, and the second operating position group corresponds to at least two operating positions of the valve core assembly 2. Operating positions where the second connection port 112 being in an unblocked state are defined as the first operating position group; and operating positions where the fourth connection port 114 being in an unblocked state are defined as the second operating position group. Correspondingly, in the first operating position group, the valve core assembly 2 closes the sixth communication port 106, and the valve core assembly 2 closes the seventh communication port 107, at the same time, the first communication port 101 is in communication with at least one of the fourth communication port 104 and the fifth communication port 105 through the second communicating portion 221, and the third communication port 103 is in communication with the second communication port 102 through the first communicating portion 211. In the second operating position group, the valve core assembly 2 closes the first communication port 101, at the same time, the seventh communication port 107 is in communication with at least one of the fourth communication port 104 and the fifth communication port 105 through the second communicating portion 221, and the sixth communication port 106 is in communication with the second communication port 102 through the first communicating portion 211. Based on this, the first operating position group may correspond to one or more of the first operating mode (a), the second operating mode (b) and the fifth operating mode (e), and the first operating position group may correspond to one or more of the second operating mode (d), the third operating mode (c) and the sixth operating mode (f). The control valve can realize one operating mode when the valve core assembly 2 is at each of the operating positions.

When in use, the control valve of a thermal management system is connected to the thermal management system, the five connection ports of the control valve may be in communication with the radiator, pump, battery cooler and the like in the vehicle, and the fluid inside the control valve may be a coolant, such as a water-glycol mixture. The thermal management system may select one or two or more of the above six operating modes, which may be selected and controlled according to the needs of the system, for example, selecting the first operating mode (a), the second operating mode (b), the third operating mode (c) and the fourth operating mode (d) thereof. In addition, according to the needs of the system, the communication mode between the connection ports is not limited to the above, and different communication modes may be realized by changing parameters such as the number, shape and position of the communicating portions, and the number, position and shape of the communication ports.

For example, in one embodiment of the control valve, the number of the communication ports, the number of the connection ports and the position thereof are kept the same as in the previous embodiment, only by reducing an opening angle of the second opening 222, the control valve may no longer have the fifth operating mode (e) and/or the sixth operating mode (f) in the previous embodiment, but rather have the first operating mode (a), the second operating mode (b), the third operating mode (c) and the fourth operating mode (d) in the previous embodiment.

Figure 2:
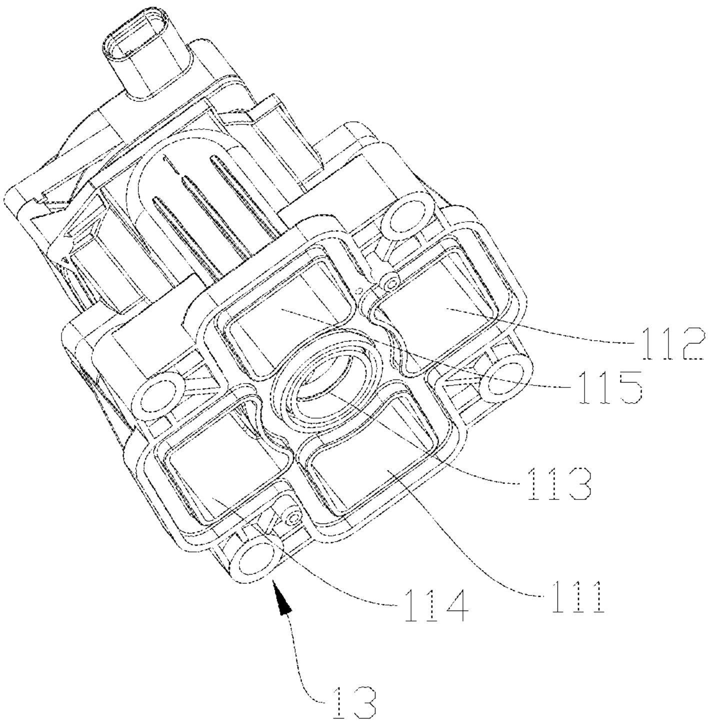
FIG. 2 is a schematic perspective view showing the structure of the control valve in FIG. 1 from another angle.
Figure 3:
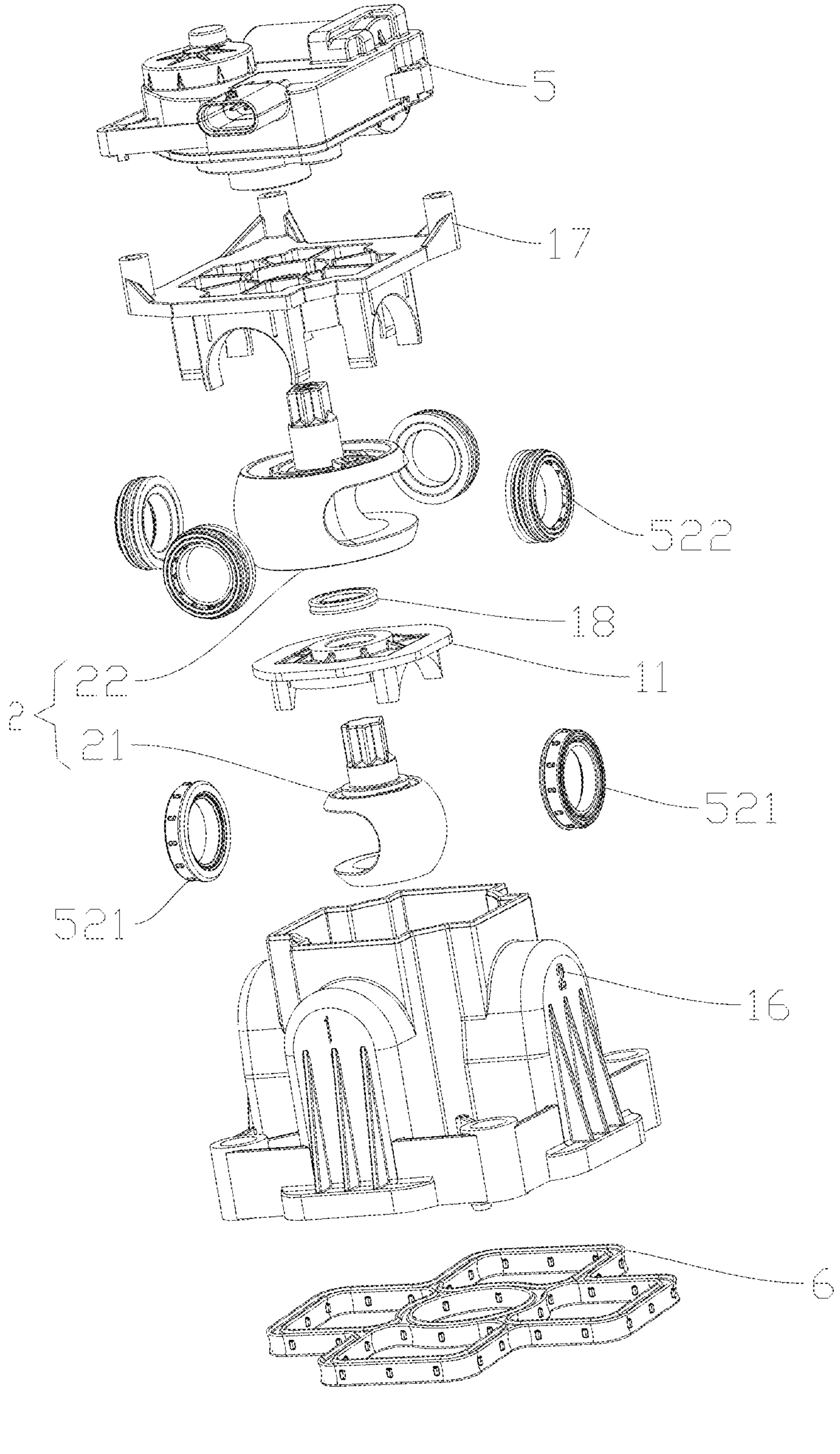
FIG. 3 is a schematic exploded view of the control valve shown in FIG. 1.
Figure 4:
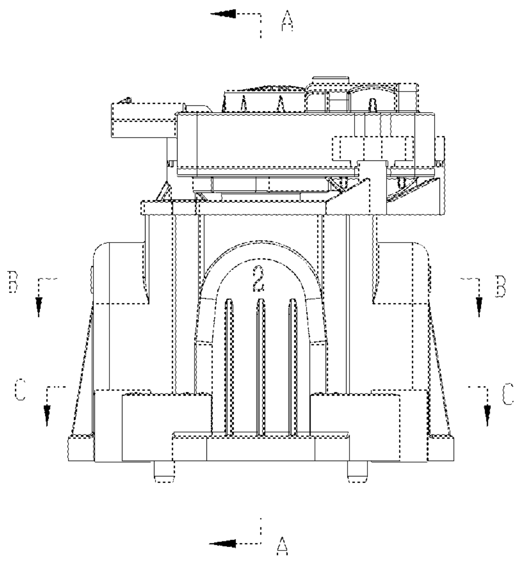
FIG. 4 is a schematic side view of the control valve shown in FIG. 1.
Figure 5:
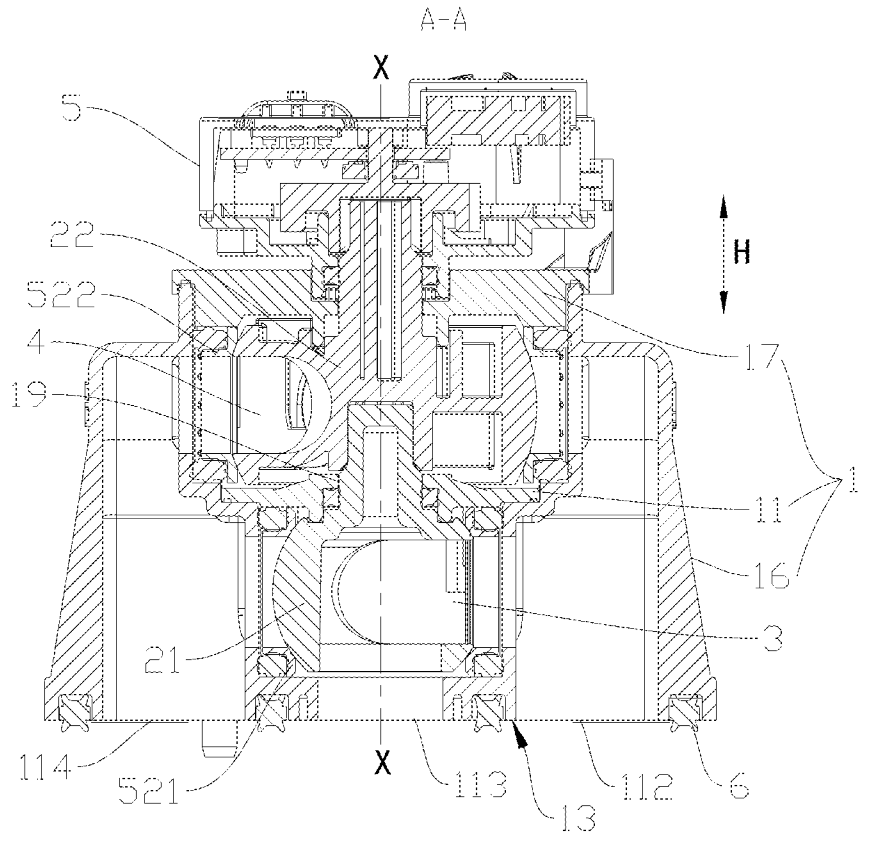
FIG. 5 is a schematic cross-sectional view showing the structure of the control valve in FIG. 4 taken along line A-A.
Figure 19:
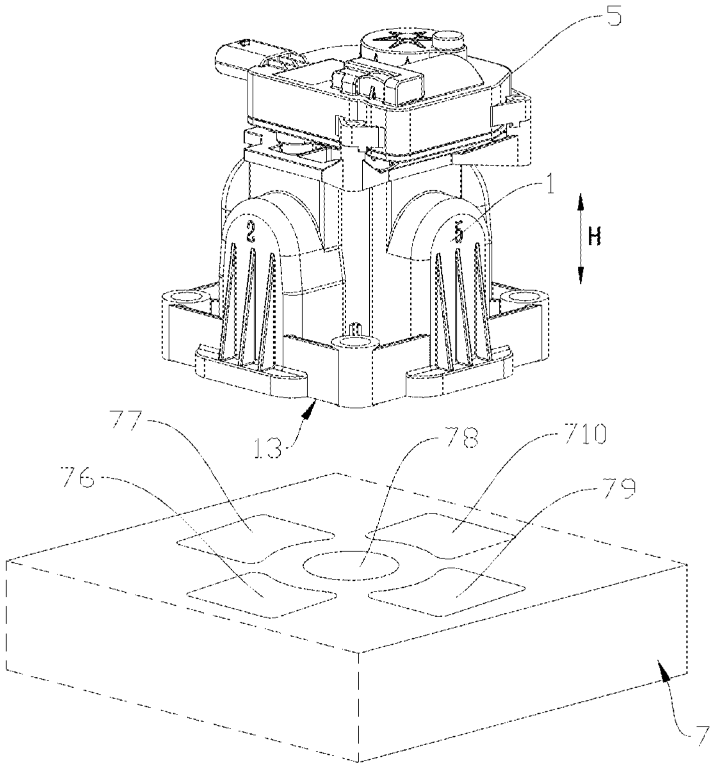
FIG. 19 is a schematic exploded view of a thermal management assembly.
Figure 20:
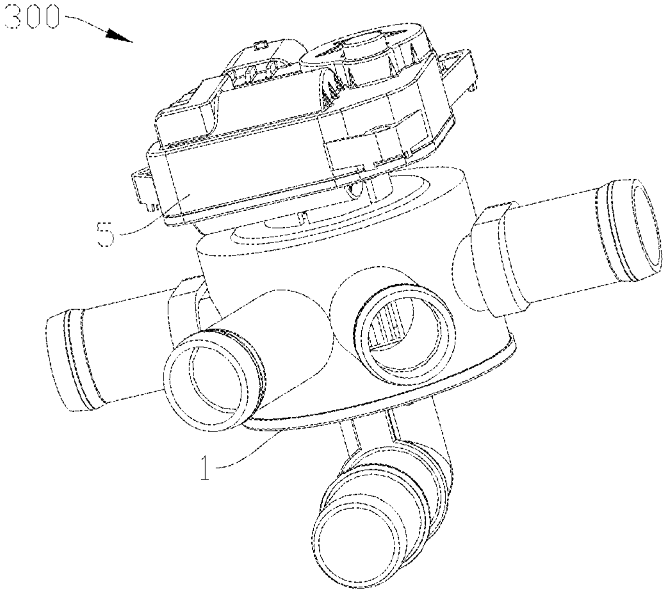
FIG. 20 is a schematic cross-sectional view showing the structure of a control valve according to another embodiment of the present application.

FIG. 19 shows a part of a thermal management assembly. The thermal management assembly includes a flow passage plate 7 and the above control valve, where the control valve may be fixedly or limitedly connected to the flow passage plate 7. As shown in FIG. 2, FIG. 5 and FIG. 19, the valve assembly 1 has a first side portion 13. The first connection port 111, the second connection port 112, the third connection port 113, the fourth connection port 114 and the fifth connection port 115 are all located on the first side portion 13. The first connection port 111, the second connection port 112, the third connection port 113, the fourth connection port 114 and the fifth connection port 115 are oriented in the same or substantially the same direction, and the first side portion 13 is used to be fixedly or limitedly connected to the flow passage plate 7. When the control valve is mounted with the flow passage plate 7, the first connection port 111, the second connection port 112, the third connection port 113, the fourth connection port 114 and the fifth connection port 115 can be communicated with corresponding ports of the flow passage plate 7 at the same time, which simplifies the mounting steps of the control valve and improves the assembly efficiency.

As shown in FIG. 5 to FIG. 9, in this embodiment, the first side portion 13 is located at one side of the valve body assembly 1 along the height direction H. The driving part 5 and the first side portion 13 are located at both sides of the control valve along the height direction H respectively. The fifth communication port 105 is located in substantially the same radial direction as the first connection port 111. The first communication port 101 and the sixth communication port 106 are located in substantially the same radial direction as the second connection port 112. The third communication port 103 and the seventh communication port 107 are located in substantially the same radial direction as the fourth connection port 114. The fourth communication port 104 is located in substantially the same radial direction as the fifth connection port 115. In this case, the length of the flow passage for communication between the connection port and the communication port can be reduced, which in turn reduces the flow resistance of the control valve, facilitates manufacturing, and facilitates molding of this flow passage. In the height direction H, a projection of the second communication port 102 on the first side portion 13 coincides or partially coincides with the third connection port 113, which reduces the length of the flow passage for communication between the third connection port 113 and the second communication port 102, thereby reducing the flow resistance and facilitating the manufacturing.

As shown in FIG. 2 to FIG. 5, the first connection port 111, the second connection port 112, the fourth connection port 114 and the fifth connection port 115 are surroundingly and symmetrically provided along the circumferential direction of the third connection port 113, so that the structure of the control valve is compact. Moreover, the control valve is provided with an integral sealing gasket 6, and the control valve can be sealed with the flow passage plate 7 by using the sealing gasket 6, which simplifies the mounting steps of the control valve and improves the assembly efficiency.

The control valve is used in the thermal management system. The thermal management system includes at least five pipelines (not shown in the figures), including a first pipeline, a second pipeline, a third pipeline, a fourth pipeline, and a fifth pipeline. Each of the five pipelines has a port at one end thereof, as shown in FIG. 19. The first pipeline has a first port 76 at one end thereof, the second pipeline has a second port 77 at one end thereof, the third pipeline has a third port 78 at one end thereof, the fourth pipeline has a fourth port 79 at one end thereof, and the fifth pipeline has a fifth port 710 at one end thereof.

The five connection ports of the control valve are used to be abutted to and in communication with the above five ports in one-to-one correspondence. For example, in one embodiment where the control valve is connected to the thermal management system, the first port 76 is in communication with the first connection port 111, the second port 77 is in communication with the second connection port 112, the third port 78 is in communication with the third connection port 113, the fourth port 79 is in communication with the fourth connection port 114, and the fifth port 710 is in communication with the fifth connection port 115. In other embodiments, without changing the positions of the other components of the thermal management system and the communication relationship, by exchanging the port connecting with the first connection port 111 and the port connecting with the fifth connection port 115, or by exchanging the port connecting with the second connection port 112 and the port connecting with the fourth connection port 114, six operating modes, being the same as those in the previous embodiments, are formed in this system. Thus, the control valve is adaptable to the thermal management systems or the flow passage plates with different piping arrangements, thus having a high versatility. In particular, for the flow passage plate 7, the control valve facilitates the arrangement of the internal pipes of the flow passage plate 7, which can reduce the staggering of the internal pipes and reduce the thickness of the flow passage plate 7.

The control valve in the above embodiment has five connection ports and seven communication ports. In other embodiments of the control valve, the number of the connection ports, the number of the communication ports, and the number of the communicating portions may be changed accordingly, and the communicating relationship between the connection ports and the communication ports may be changed so as to make it applicable to different communication situations. The number of the connection ports of the control valve may be five or more, the number of the communication ports of the control valve may be five or more, and the number of the communicating portions may be two or more. For example, the second valve core portion 22 may have two communicating portions. The number of the communication ports in communication with the same connection port may be two or more. For example, three communication ports are in communication with one connection port.

Another embodiment of the control valve is shown in FIG. 20 to FIG. 29.

As shown in FIG. 20 to FIG. 25, the control valve 300 includes a valve body assembly 1 and a valve core assembly 2. The valve body assembly 1 has two communicating portions, five communication ports and five connection ports. The control valve 300 has a valve cavity 100 in which the valve core assembly 2 is at least partially located. The valve body assembly 1 has a first communication port 101, a second communication port 102, a third communication port 103, a fourth communication port 104 and a fifth communication port 105. The valve core assembly 2 has a first communicating portion 211 and a second communicating portion 221. The valve body assembly 1 has a first connection port 111, a second connection port 112, a third connection port 113, a fourth connection port 114 and a fifth connection port 115. The second communication port 102 is in communication with the third connection port 113, the fourth communication port 104 is in communication with the fifth connection port 115, the fifth communication port 105 is in communication with the first connection port 111, and the third communication port 103 is in communication with the fourth connection port 114. The first communication port 101 is in communication with the second connection port 112. The valve core assembly 2 can rotate around the valve core axis X-X, and the height direction H is parallel to the valve core axis X-X.

Figure 23:
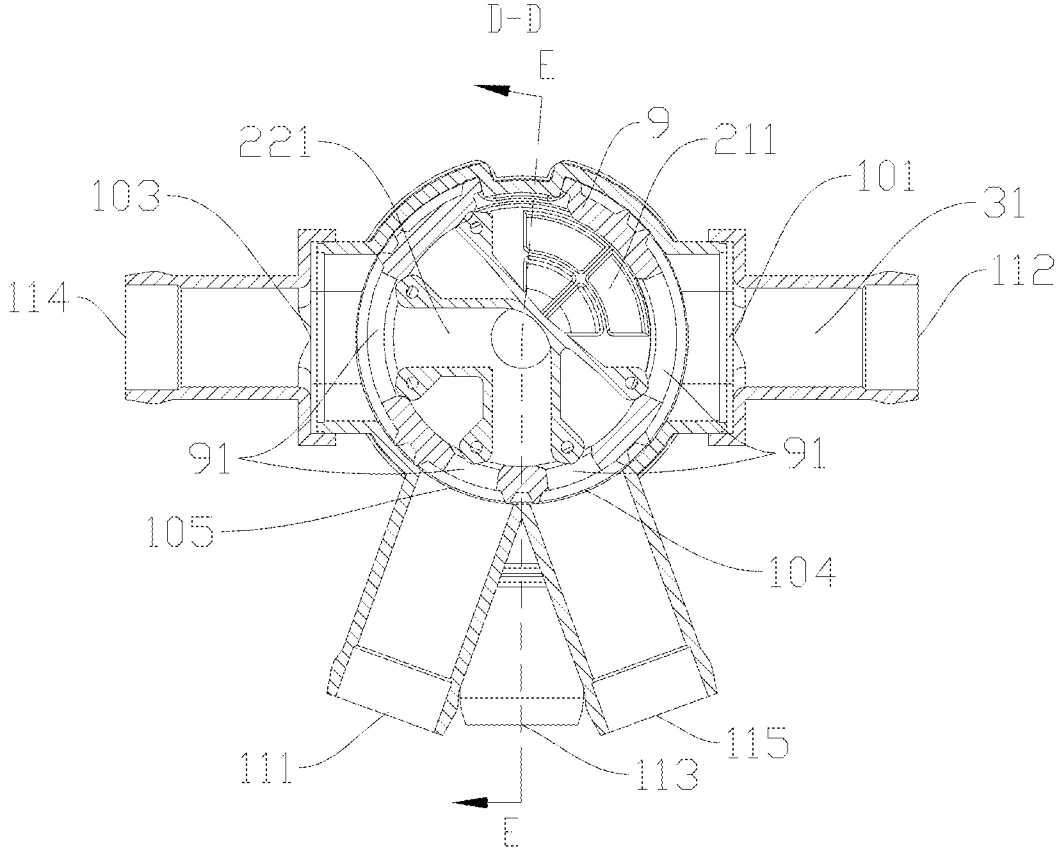
FIG. 23 is a schematic cross-sectional view showing the structure of the control valve in FIG. 22 taken along line D-D.
Figure 24:
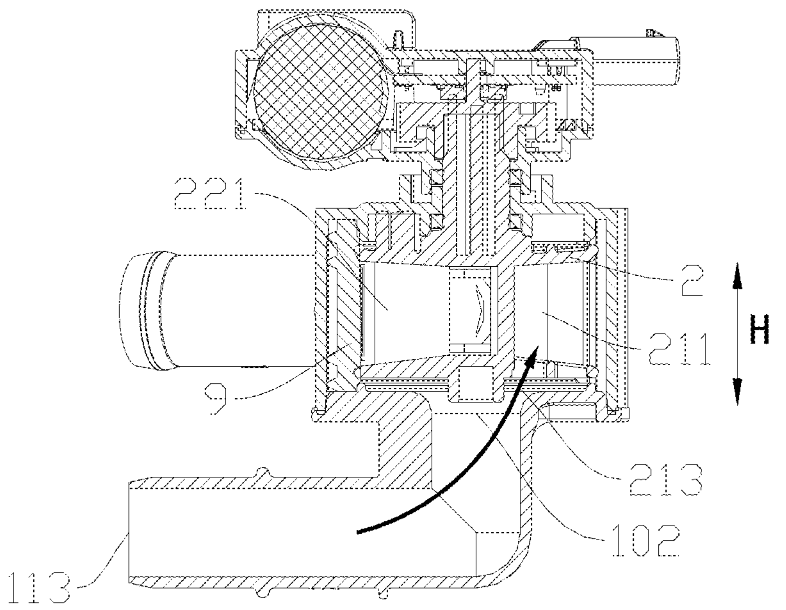
FIG. 24 is a schematic cross-sectional view showing the structure of the control valve in FIG. 23 taken along line E-E.
Figure 25:
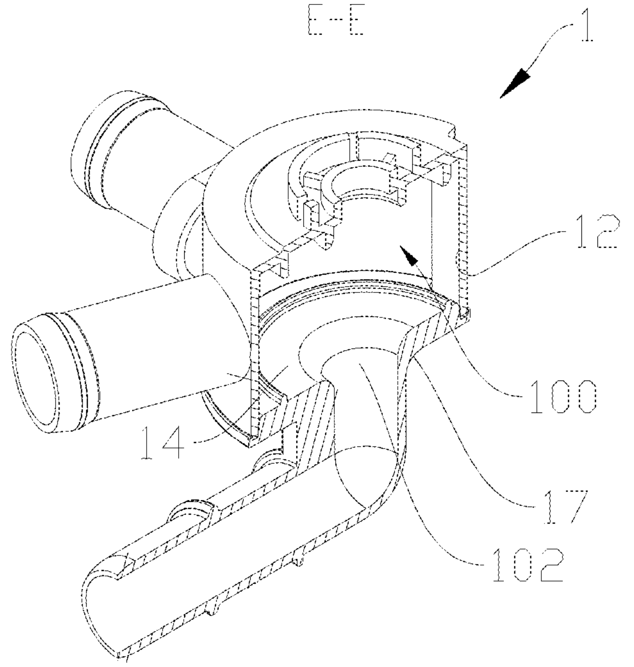
FIG. 25 is a schematic perspective cross-sectional view showing the structure of a valve body assembly of the control valve in FIG. 23 taken along line E-E.
Figure 26:
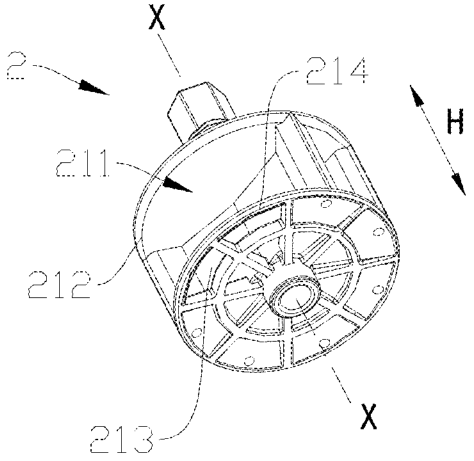
FIG. 26 is a schematic perspective view showing the structure of a valve core assembly of the control valve in FIG. 23.
Figure 27:
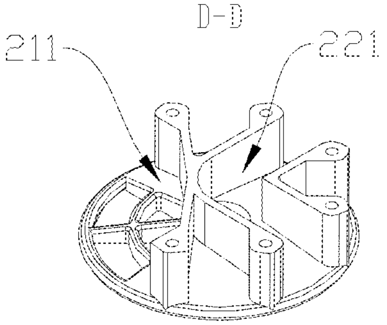
FIG. 27 is a schematic perspective cross-sectional view showing the structure of the valve core assembly of the control valve in FIG. 23 taken along line D-D.

As shown in FIG. 23 to FIG. 25, the valve body assembly 1 includes a valve cover 17 and a housing 16. The valve cover 17 and the housing 16 may be welded and fixed after the valve core assembly 2 is mounted. The third connection port 113, the second communication port 102 and the bottom wall 14 are all located at the valve cover 17. The first communication port 101, the third communication port 103, the fourth communication port 104 and the fifth communication port 105 are all located on the side wall 12, and the second communication port 102 is located on the bottom wall 14. The second communication port 102 and the third communication port 103 are arranged in a staggered manner in the height direction H, which can reduce the number of the communication ports at the same height and further reduce the radial size of the valve cavity 100. The fourth communication port 104, the fifth communication port 105, the first communication port 101 and the third communication port 103 are located in substantially the same height range and in different radial directions. In other embodiments, the middle parts of the openings of the first communication port 101, the fifth communication port 105 and the fourth communication port 104 are located at a height in the height range of the opening of the third communication port 103.

As shown in FIG. 24 to FIG. 27, the valve core assembly 2 is columnar or substantially columnar in shape, and the first communicating portion 211 has a first opening 212 at the outer periphery of the valve core assembly 2, and the middle part of the first opening 212 is located at a height in the height range of the opening of the third communication port 103. The first communicating portion 211 is provided with a third opening 213 on an axial side of a valve core of the first valve core portion 21, and the third opening 213 faces the bottom wall 14. The third opening 213 always has a part facing the second communication port 102, so the first communicating portion 211 is always in communication with the second communication port 102, and the center of the second communication port 102 is coaxial or substantially coaxial with the valve core axis of the valve core assembly 2.

In this embodiment, the first opening 212 and the third opening 213 are separated from each other, and a bracket 214 may be arranged between the first opening 212 and the third opening 213. The bracket 214 can contact with the housing 16, and the bracket 214 supports the valve core assembly 2 in the axial direction, to make the valve core assembly 2 be uniformly stressed. In other embodiments, the first opening 212 and the third opening 213 may meet or be combined into the same opening.

Figure 21:
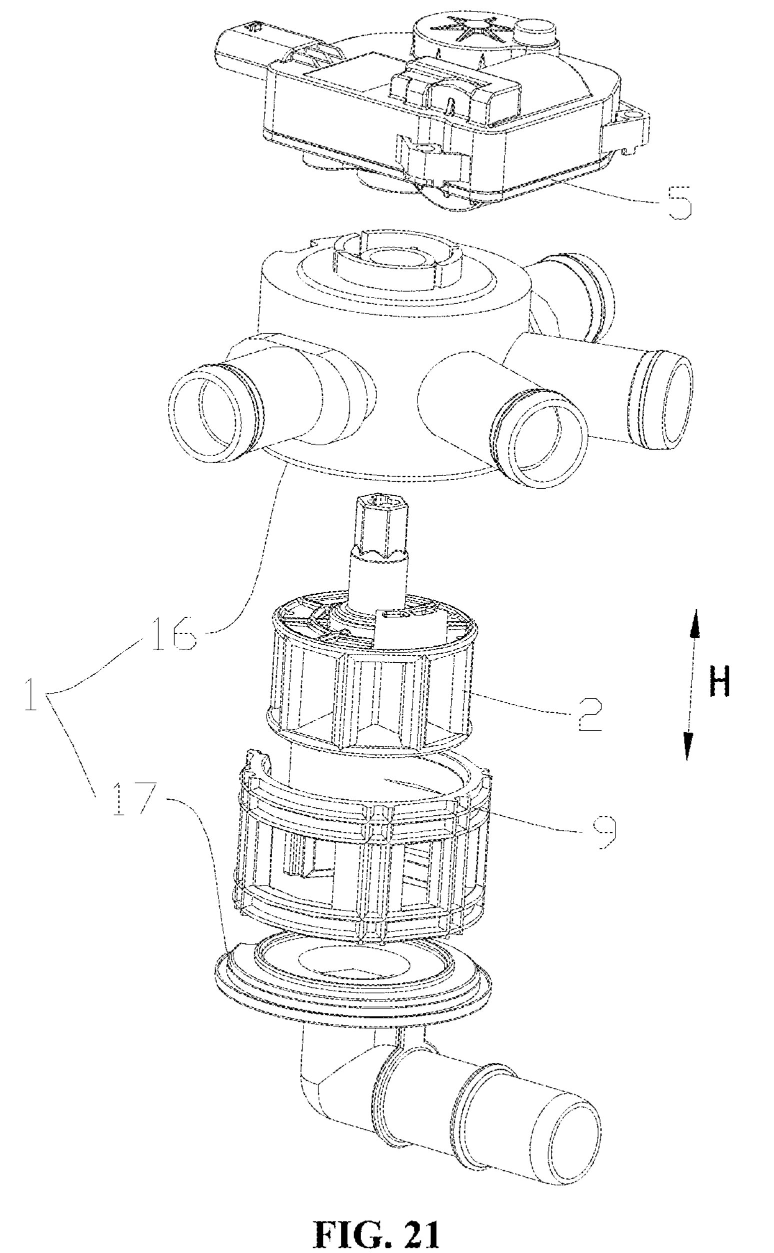
FIG. 21 is a schematic exploded view of the control valve shown in FIG. 20.
Figure 22:
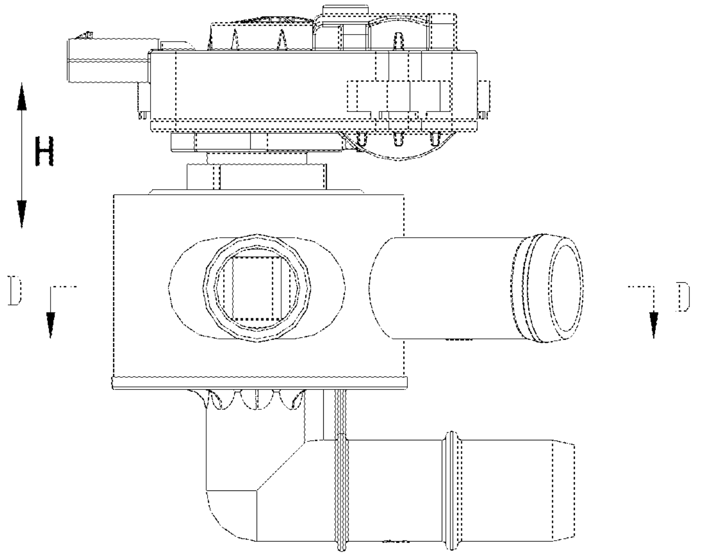
FIG. 22 is a schematic side view of the control valve shown in FIG. 20.

As shown in FIG. 21 and FIG. 23, the control valve 300 includes a fourth sealing member 9, which is located between the side wall 12 and the valve core assembly 2. The fourth sealing member 9 is in a bent plate shape, which is arranged on the circumference of the valve core assembly 2. The fourth sealing member 9 is integrally formed to facilitate assembly. The fourth sealing member 9 has four second through holes 91, and the second through holes 91 are provided in one-to-one correspondence with the fourth communication port 104, the fifth communication port 105, the first communication port 101 and the third communication port 103. At least a part of the fourth sealing member 9 is elastic, and the fourth sealing member 9 is capable of contacting both the side wall 12 and the valve core assembly 2, and sealing at the contact positions, enabling the valve core assembly 2 to close or open the communication port.

As shown in FIG. 23, compared with the previous embodiment, in the control valve 300 of this embodiment, some flow passages connecting the connection ports with the communication ports may extend in the direction perpendicular to the valve core axis, and the flow passages are radially arranged around the valve core axis. For example, the first flow passage 31 connects the first communication port 101 with the second connection port 112, which can reduce corners in the flow passages, thereby reducing the flow resistance of the control valve 300. In addition, the valve core assembly 2 in this embodiment may be integrally formed, which, compared with the previous embodiment, has a simpler structure and fewer parts, thereby making the assembly process easier.

Figure 28A:
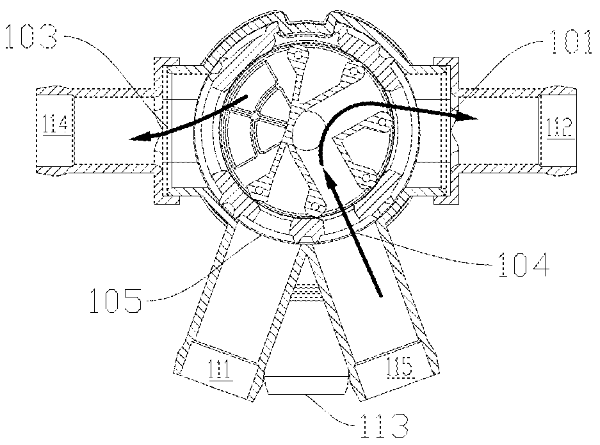
FIG. 28*a* is a schematic cross-sectional view showing the structure of the control valve in FIG. 23 in a first operating mode taken along line D-D.
Figure 28B:
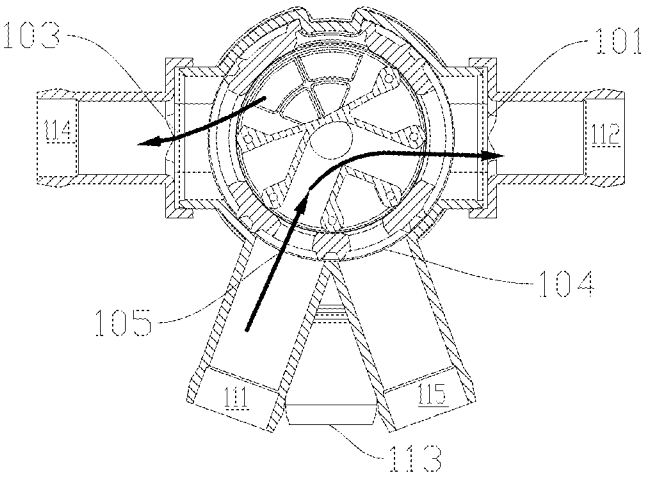
FIG. 28*b* is a schematic cross-sectional view showing the structure of the control valve in FIG. 23 in a second operating mode taken along line D-D.
Figure 28C:
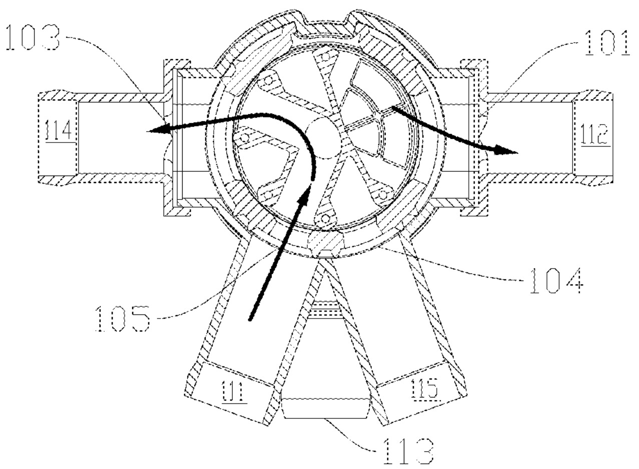
FIG. 28*c* is a schematic cross-sectional view showing the structure of the control valve in FIG. 23 in a third operating mode taken along line D-D.
Figure 28D:
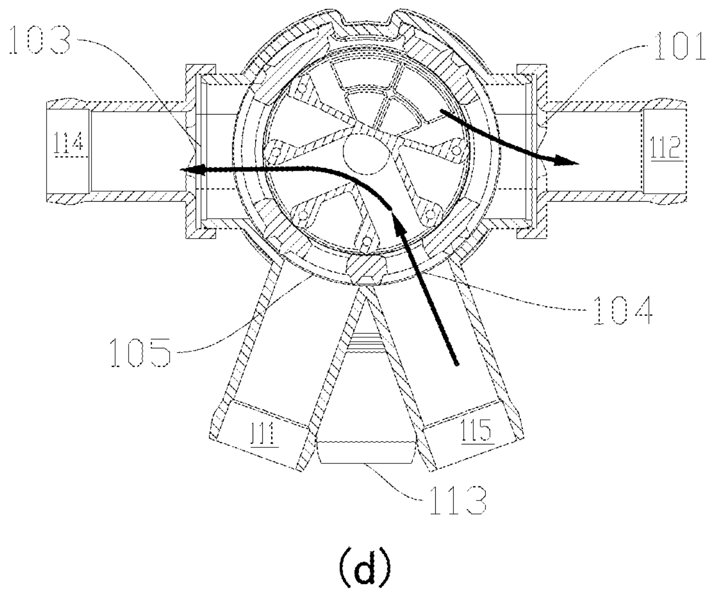
FIG. 28*d* is a schematic cross-sectional view showing the structure of the control valve in FIG. 23 in a fourth operating mode taken along line D-D.
Figure 28E:
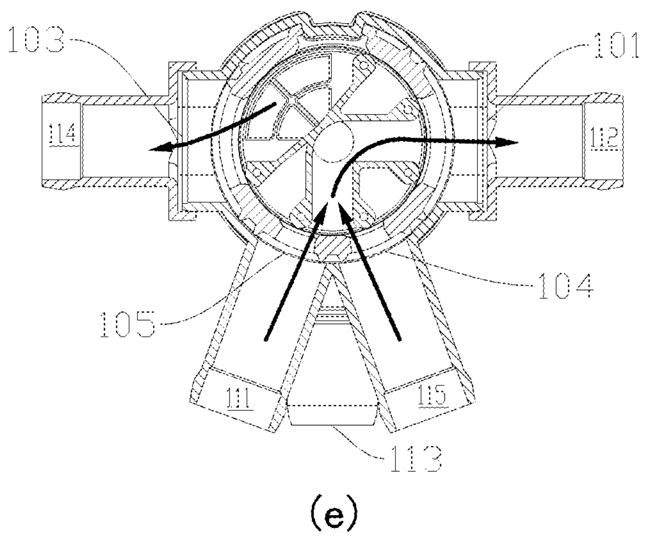
FIG. 28*e* is a schematic cross-sectional view showing the structure of the control valve in FIG. 23 in a fifth operating mode taken along line D-D.
Figure 28F:
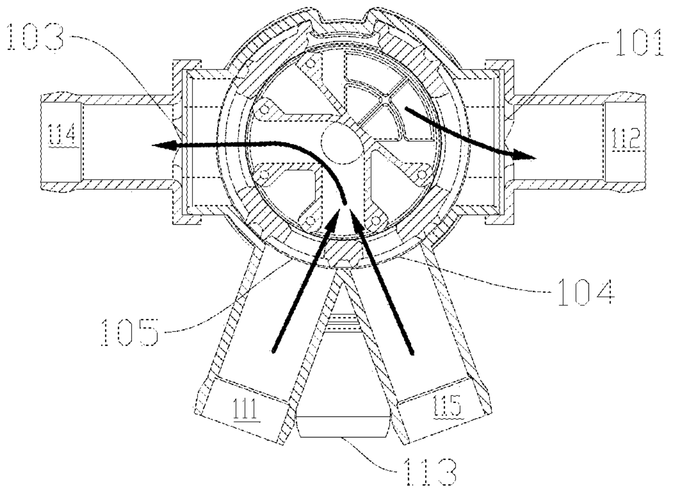
FIG. 28*f* is a schematic cross-sectional view showing the structure of the control valve in FIG. 23 in a sixth operating mode taken along line D-D.
Figure 29:
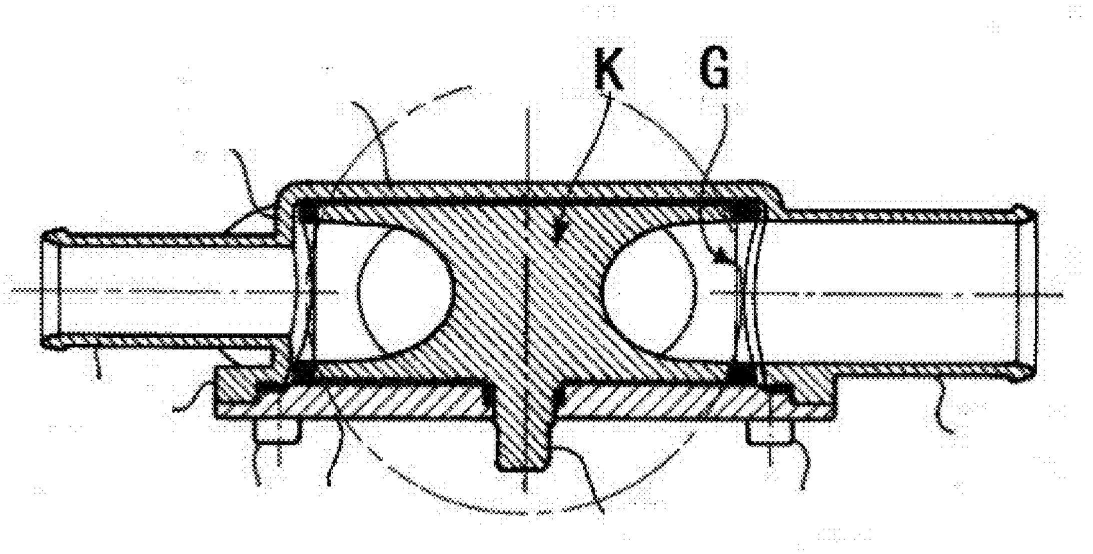
FIG. 29 is a cross-sectional view of a common multi-way valve.

The valve core assembly 2 may have various operating positions during rotation. In the first operating position of the valve core assembly 2, as shown in FIG. 28*a*, the second communicating portion 221 is in communication with the first communication port 101, the second communicating portion 221 is in communication with the fourth communication port 104, the first communicating portion 211 is in communication with the second communication port 102, and the first communicating portion 211 is in communication with the third communication port 103. In the second operating position of the valve core assembly 2, as shown in FIG. 28*b*, the second communicating portion 221 is in communication with the first communication port 101, the second communicating portion 221 is in communication with the fifth communication port 105, the first communicating portion 211 is in communication with the second communication port 102, and the first communicating portion 211 is in communication with the third communication port 103.

As shown in FIG. 28*a* to FIG. 28*f*, the unidirectional arrows in FIG. 24 and FIG. 28*a* to FIG. 28*f* show flow paths of the fluid in the control valve 300. The control valve 300 includes at least the following six operating modes for selection.

In the first operating mode (a), the third connection port 113 is in communication with the fourth connection port 114 through the second communication port 102, the first communicating portion and the third communication port. The second connection port 112 is in communication with the fifth connection port 115 through the first communication port, the second communicating portion and the fourth communication port.

In the second operating mode (b), the third connection port 113 is in communication with the fourth connection port 114 through the second communication port 102, the first communicating portion and the third communication port. The second connection port 112 is in communication with the first connection port 111 through the first communication port, the second communicating portion and the fifth communication port.

In the third operating mode (c), the third connection port 113 is in communication with the second connection port 112 through the second communication port 102, the first communicating portion and the first communication port 101. The fourth connection port 114 is in communication with the first connection port 111 through the third communication port 103, the second communicating portion and the fifth communication port.

In the fourth operating mode (d), the third connection port 113 is in communication with the second connection port 112 through the second communication port 102, the first communicating portion and the first communication port 101. The fourth connection port 114 is in communication with the fifth connection port 115 through the third communication port 103, the second communicating portion and the fourth communication port.

In the fifth operating mode (e), the third connection port 113 is in communication with the fourth connection port 114 through the second communication port 102, the first communicating portion 211 and the third communication port 103. The second connection port 112 is in communication with the fifth connection port 115 through the first communication port 101, the second communicating portion 221 and the fourth communication port 104. The second connection port 112 is in communication with the first connection port 111 through the first communication port 101, the second communicating portion 221 and the fifth communication port 105. In this operating mode, both the first connection port 111 and the fifth connection port 115 are in communication with the second connection port 112, and a ratio of a flow amount flowing from the first connection port 111 into the second connection port 112 to a flow amount flowing from the fifth connection port 115 into the second connection port 112 can be adjusted by controlling the valve core assembly 2. For example, in FIG. 28*e*, in the flow amount of the fluid flowing into the second connection port 112, 50% of the flow amount comes from the first connection port 111, and 50% of the flow amount comes from the fifth connection port 115.

In the sixth operating mode (f), the third connection port 113 is in communication with the second connection port 112 through the second communication port 102, the first communicating portion 211 and the first communication port 101, the fourth connection port 114 is in communication with the first connection port 111 through the third communication port 103, the second communicating portion 221 and the fifth communication port 105, and the fourth connection port 114 is in communication with the fifth connection port 115 through the third communication port 103, the second communicating portion 221 and the fourth communication port 114. In this operating mode, both the first connection port 111 and the fifth connection port 115 are in communication with the fourth connection port 114, and a ratio of a flow amount flowing from the first connection port 111 into the fourth connection port 114 to a flow amount flowing from the fifth connection port 115 into the fourth connection port 114 can be adjusted by controlling the valve core assembly 2. For example, in FIG. 28*f*, in the flow amount of the fluid flowing into the fourth connection port 114, 50% of the flow amount comes from the first connection port 111, and 50% of the flow amount comes from the fifth connection port 115.

In other embodiments, the flow direction of the fluid may be opposite to the flowing directions in FIG. 24 and FIG. 28*a* to FIG. 28*f*.

It should be noted that, the above embodiments are only intended to illustrate the present application rather than limit the technical solutions described in the present application. Although the present specification has been described in detail with reference to the above embodiments, it should be understood by those skilled in the art that, modifications or equivalent substitutions can still be made by those skilled in the art to the technical solutions of the present application without departing from the spirit and scope of the present application, all of which should be covered within the scope of the claims of the present application.

The invention claimed is:

1. A control valve, comprising a valve body assembly and a valve core assembly, wherein the control valve has a valve cavity, and the valve core assembly is at least partially located in the valve cavity;

the valve body assembly is provided with a communication port, wherein the communication port is located on a wall defining the valve cavity, and the communication port comprises a first communication port, a second communication port, a third communication port, a fourth communication port and a fifth communication port;

the valve core assembly has a first communicating portion and a second communicating portion; wherein in a first operating position of the valve core assembly, the second communicating portion is in communication with the first communication port, the second communicating portion is in communication with the fourth communication port, the first communicating portion is in communication with the second communication port, and the first communicating portion is in communication with the third communication port;

in a second operating position of the valve core assembly, the second communicating portion is in communication with the first communication port, the second communicating portion is in communication with the fifth communication port, the first communicating portion is in communication with the second communication port, and the first communicating portion is in communication with the third communication port; and a height direction is defined, which is parallel to an extension direction of a valve core axis of the valve core assembly, and in the height direction, the second communication port and the third communication port are provided in a staggered manner; wherein the valve body assembly is provided with a first connection port, a second connection port, a third connection port, a fourth connection port and a fifth connection port, and the communication port further comprises a sixth communication port and a seventh communication port; and the second communication port is in communication with the third connection port, the fourth communication port is in communication with the fifth connection port, the fifth communication port is in communication with the first connection port, both the third communication port and the seventh communication port are in communication with the fourth connection port, and both the first communication port and the sixth communication port are in communication with the second connection port.

2. The control valve according to claim 1, wherein the valve core assembly is configured to rotate around the valve core axis;

the wall defining the valve cavity comprises a bottom wall and a side wall, wherein the bottom wall is located at a side of the valve cavity along the height direction, and the side wall extends along the height direction; and the first communication port, the third communication port, the fourth communication port and the fifth communication port are all located on the side wall, and the second communication port is located on the bottom wall.

3. The control valve according to claim 2, wherein the first communication port and the third communication port are provided in a staggered manner along the height direction.

4. The control valve according to claim 3, wherein a middle part of an opening of the sixth communication port is located at a height in a height range of an opening of the third communication port, a middle part of an opening of the fifth communication port is located at a height in a height range of an opening of the first communication port, a middle part of an opening of the fourth communication port is located at a height in a height range of the opening of the first communication port, and a middle part of an opening of the seventh communication port is located at a height in a height range of the opening of the first communication port, and a center of the second communication port is coaxial or substantially coaxial with the valve core axis of the valve core assembly.

5. The control valve according to claim 4, wherein the fourth communication port, the first communication port, the fifth communication port and the seventh communication port are arranged along a circumferential direction of the valve core assembly in the listed sequence, a center of the sixth communication port and a center of the third communication port are arranged around the valve core axis at an interval of 120 degrees to 180 degrees, a center of the first communication port and a center of the seventh communication port are arranged around the valve core axis at an interval of 120 degrees to 180 degrees, and a center of the fourth communication port and a center of the fifth communication port are arranged around the valve core axis at an interval of 120 degrees to 180 degrees.

6. The control valve according to claim 5, wherein the first communicating portion has a first opening at an outer wall of the valve core assembly, and the second communicating portion has a second opening on the outer wall of the valve core assembly;

a middle part of the first opening is located at a height in a height range of an opening of the third communication port, and a middle part of the second opening is located at a height in a height range of an opening of the first communication port; and the first opening and the second opening are oriented opposite to each other in a direction perpendicular to the valve core axis.

7. The control valve according to claim 4, wherein the first communicating portion has a first opening at an outer wall of the valve core assembly, and the second communicating portion has a second opening on the outer wall of the valve core assembly;

a middle part of the first opening is located at a height in a height range of an opening of the third communication port, and a middle part of the second opening is located at a height in a height range of an opening of the first communication port; and the first opening and the second opening are oriented opposite to each other in a direction perpendicular to the valve core axis.

8. The control valve according to claim 3, wherein a center of the first communication port and a center of the sixth communication port are arranged around the valve core axis at an interval of 0 degrees to 10 degrees, and a center of the seventh communication port and a center of the third communication port are arranged around the valve core axis at an interval of 0 degrees to 10 degrees.

9. The control valve according to claim 8, wherein the first communicating portion has a first opening at an outer wall of the valve core assembly, and the second communicating portion has a second opening on the outer wall of the valve core assembly;

a middle part of the first opening is located at a height in a height range of an opening of the third communication port, and a middle part of the second opening is located at a height in a height range of an opening of the first communication port; and the first opening and the second opening are oriented opposite to each other in a direction perpendicular to the valve core axis.

10. The control valve according to claim 3, wherein the first communicating portion has a first opening at an outer wall of the valve core assembly, and the second communicating portion has a second opening on the outer wall of the valve core assembly;

a middle part of the first opening is located at a height in a height range of an opening of the third communication port, and a middle part of the second opening is located at a height in a height range of an opening of the first communication port; and the first opening and the second opening are oriented opposite to each other in a direction perpendicular to the valve core axis.

11. The control valve according to claim 10, wherein two ends of the second opening along a circumferential direction thereof are located around the valve core axis at an interval of 160 degrees to 200 degrees, and two ends of the first opening along a circumferential direction thereof are located around the valve core axis at an interval of 160 degrees to 200 degrees.

12. The control valve according to claim 10, wherein the second communicating portion has only the second opening within a height range of the second opening, and the first communicating portion has only the first opening within a height range of the first opening;

a part of the first communicating portion is coaxial with the valve core axis and is provided with an opening at an axial side of the valve core assembly, and the first communicating portion is always in communication with the second communication port; and the first communication port, the fifth communication port, the fourth communication port and the seventh communication port are surroundingly and symmetrically provided along the circumferential direction of the valve core assembly.

13. The control valve according to claim 10, wherein the control valve at least comprises at least one of the following four operating modes:

in a first operating mode, the third connection port is in communication with the fourth connection port through the second communication port, the first communicating portion and the third communication port, and the second connection port is in communication with the fifth connection port through the first communication port, the second communicating portion and the fourth communication port;

in a second operating mode, the third connection port is in communication with the fourth connection port through the second communication port, the first communicating portion and the third communication port, and the second connection port is in communication with the first connection port through the first communication port, the second communicating portion and the fifth communication port;

in a third operating mode, the third connection port is in communication with the second connection port through the second communication port, the first communicating portion and the sixth communication port, and the fourth connection port is in communication with the first connection port through the seventh communication port, the second communicating portion and the fifth communication port; and in a fourth operating mode, the third connection port is in communication with the second connection port through the second communication port, the first communicating portion and the sixth communication port, and the fourth connection port is in communication with the fifth connection port through the seventh communication port, the second communicating portion and the fourth communication port.

14. The control valve according to claim 10, wherein the control valve at least comprises at least one of six operating modes:

in a first operating mode, the third connection port is in communication with the fourth connection port through the second communication port, the first communicating portion and the third communication port, and the second connection port is in communication with the fifth connection port through the first communication port, the second communicating portion and the fourth communication port, and the first connection port is not in communication with any other connection ports;

in a second operating mode, the third connection port is in communication with the fourth connection port through the second communication port, the first communicating portion and the third communication port, and the second connection port is in communication with the first connection port through the first communication port, the second communicating portion and the fifth communication port, and the fifth connection port is not in communication with any other connection ports;

in a third operating mode, the third connection port is in communication with the second connection port through the second communication port, the first communicating portion and the sixth communication port, and the fourth connection port is in communication with the first connection port through the seventh communication port, the second communicating portion and the fifth communication port, and the fifth connection port is not in communication with any other connection ports;

in a fourth operating mode, the third connection port is in communication with the second connection port through the second communication port, the first communicating portion and the sixth communication port, and the fourth connection port is in communication with the fifth connection port through the seventh communication port, the second communicating portion and the fourth communication port, and the first connection port is not in communication with any other connection ports;

in a fifth operating mode, the third connection port is in communication with the fourth connection port through the second communication port, the first communicating portion and the third communication port; the second connection port is in communication with the fifth connection port through the first communication port, the second communicating portion and the fourth communication port; the second connection port is in communication with the first connection port through the first communication port, the second communicating portion and the fifth communication port; wherein a ratio of a flow amount flowing from the first connection port into the second connection port to a flow amount flowing from the fifth connection port into the second connection port is adjustable by controlling the valve core assembly, or, a ratio of a flow amount flowing from the second connection port into the first connection port to a flow amount flowing from the second connection port into the fifth connection port is adjustable by controlling the valve core assembly; and in a sixth operating mode, the third connection port is in communication with the second connection port through the second communication port, the first communicating portion and the sixth communication port; the fourth connection port is in communication with the first connection port through the seventh communication port, the second communicating portion and the fifth communication port; the fourth connection port is in communication with the fifth connection port through the seventh communication port, the second communicating portion and the fourth communication port; wherein a ratio of a flow amount flowing from the first connection port into the fourth connection port to a flow amount flowing from the fifth connection port into the fourth connection port is adjustable by controlling the valve core assembly, or, a ratio of a flow amount flowing from the fourth connection port into the first connection port to a flow amount flowing from the fourth connection port into the fifth connection port is adjustable by controlling the valve core assembly.

15. The control valve according to claim 2, wherein middle parts of openings of the first communication port, the fifth communication port and the fourth communication port are each located at a height in a height range of an opening of the third communication port.

16. The control valve according to claim 15, wherein the valve core assembly is columnar or substantially columnar in shape, the first communicating portion has a first opening at an outer periphery of the valve core assembly, and a middle part of the first opening is located at a height in the height range of the opening of the third communication port; and the first communicating portion is provided with a third opening on an axial side of a valve core of the valve core assembly, wherein the third opening faces the bottom wall, the first communicating portion is always in communication with the second communication port, and a center of the second communication port is coaxial or substantially coaxial with the valve core axis of the valve core assembly.

17. The control valve according to claim 15, wherein the control valve at least comprises the following four operating modes for selection:

a first operating mode, wherein the third connection port is in communication with the fourth connection port through the second communication port, the first communicating portion and the third communication port; and the second connection port is in communication with the fifth connection port through the first communication port, the second communicating portion and the fourth communication port;

a second operating mode, wherein the third connection port is in communication with the fourth connection port through the second communication port, the first communicating portion and the third communication port; and the second connection port is in communication with the first connection port through the first communication port, the second communicating portion and the fifth communication port;

a third operating mode, wherein the third connection port is in communication with the second connection port through the second communication port, the first communicating portion and the first communication port; and the fourth connection port is in communication with the first connection port through the third communication port, the second communicating portion and the fifth communication port; and a fourth operating mode, wherein the third connection port is in communication with the second connection port through the second communication port, the first communicating portion and the first communication port; and the fourth connection port is in communication with the fifth connection port through the third communication port, the second communicating portion and the fourth communication port.

* * * * *